US008007867B2

(12) United States Patent
Tomekawa et al.

(10) Patent No.: US 8,007,867 B2
(45) Date of Patent: Aug. 30, 2011

(54) MULTILAYERED INFORMATION RECORDING MEDIUM AND PROCESS FOR PRODUCING SAID MULTILAYERED INFORMATION RECORDING MEDIUM, AND APPARATUS FOR PRODUCING MULTILAYERED INFORMATION RECORDING MEDIUM AND SCREEN CONSTITUTING SAID PRODUCTION APPARATUS FOR PRODUCING MULTILAYERED INFORMATION RECORDING MEDIUM

(75) Inventors: Yuuko Tomekawa, Osaka (JP); Morio Tomiyama, Nara (JP); Keiji Nishikiori, Kyoto (JP)

(73) Assignee: Panasonic Corporation, Osaka (JP)

( * ) Notice: Subject to any disclaimer, the term of this patent is extended or adjusted under 35 U.S.C. 154(b) by 815 days.

(21) Appl. No.: 11/997,509

(22) PCT Filed: Aug. 30, 2006

(86) PCT No.: PCT/JP2006/317112
§ 371 (c)(1),
(2), (4) Date: Jan. 31, 2008

(87) PCT Pub. No.: WO2007/026765
PCT Pub. Date: Mar. 8, 2007

(65) Prior Publication Data
US 2010/0151177 A1    Jun. 17, 2010

(30) Foreign Application Priority Data

Aug. 30, 2005 (JP) ................... 2005-249889

(51) Int. Cl.
*G11B 7/26* (2006.01)
*B05D 1/32* (2006.01)
*B05C 3/00* (2006.01)

(52) U.S. Cl. ........ 427/282; 427/256; 427/258; 427/260; 427/287; 427/162; 427/164; 427/165; 427/166; 427/402; 427/407.1; 427/407.2; 427/487; 427/508; 118/256; 118/258; 118/261; 118/407; 118/412; 118/200; 118/100; 118/104; 118/203; 118/400; 118/406

(58) Field of Classification Search .................. 427/162, 427/508, 402, 407.1, 256, 258, 271, 282; 118/261, 412, 203, 104
See application file for complete search history.

(56) References Cited

U.S. PATENT DOCUMENTS 5,197,384 A    3/1993  Yawata et al.
(Continued)

FOREIGN PATENT DOCUMENTS

CN          1157724         7/2004
(Continued)

*Primary Examiner* — Dah-Wei D Yuan
*Assistant Examiner* — Lisha Jiang
(74) *Attorney, Agent, or Firm* — Hamre, Schumann, Mueller & Larson, P.C.

(57) ABSTRACT

The present invention provides a method for manufacturing a multilayer information recording medium including at least two information recording portions and a resin layer interposed between the information recording portions, both of which are disposed on a signal substrate. The method includes a first process of forming a predetermined information recording portion on one principal surface of the signal substrate and a second process of passing a part of a resin-containing coating, which is supplied on a screen having an application region with a plurality of first pores and a removal region with a plurality of second pores, through the first pores by sliding a squeegee on the screen so as to form a coating layer on the predetermined information recording portion, and curing the resin contained in the coating layer so as to form the resin layer. The first process and the second process are carried out respectively a predetermined number of times. In each second process, at least a part of the resin-containing coating that has not been applied on the predetermined information recording portion and that remains on the screen is allowed to pass through the second pores so as to be removed from the screen surface.

18 Claims, 24 Drawing Sheets

U.S. PATENT DOCUMENTS

| | | | |
|---|---|---|---|
| 5,202,171 A | 4/1993 | Anezaki et al. | |
| 5,312,663 A | 5/1994 | Kosinski et al. | |
| 5,336,531 A | 8/1994 | Nakayama et al. | |
| RE35,947 E | 11/1998 | Kosinski et al. | |
| 6,103,795 A | 8/2000 | Leugs et al. | |
| 6,136,133 A | 10/2000 | Maruyama et al. | |
| 6,270,611 B1* | 8/2001 | Ohki et al. | 156/220 |
| 6,676,791 B1 | 1/2004 | Kondo et al. | |
| 2001/0043555 A1 | 11/2001 | Hisada et al. | |
| 2001/0053122 A1 | 12/2001 | Yukumoto et al. | |
| 2002/0011299 A1 | 1/2002 | Miyamoto et al. | |
| 2002/0031632 A1 | 3/2002 | Hisada et al. | |
| 2002/0057645 A1 | 5/2002 | Kishima | |
| 2003/0099770 A1* | 5/2003 | Hayashi et al. | 427/128 |
| 2003/0199655 A1 | 10/2003 | Yurugi et al. | |
| 2004/0004300 A1 | 1/2004 | Yamaguchi et al. | |
| 2004/0027974 A1 | 2/2004 | Hisada et al. | |
| 2004/0232570 A1 | 11/2004 | Hayashi et al. | |
| 2006/0018242 A1* | 1/2006 | Tomiyama et al. | 369/272.1 |
| 2006/0182890 A1* | 8/2006 | Takahashi et al. | 427/355 |
| 2006/0188653 A1* | 8/2006 | Takahashi et al. | 427/282 |

FOREIGN PATENT DOCUMENTS

| | | |
|---|---|---|
| EP | 0 443 522 | 8/1991 |
| EP | 1 296 319 | 3/2003 |
| EP | 1 403 861 | 3/2004 |
| EP | 1 571 659 | 9/2005 |
| EP | 1 669 991 | 6/2006 |
| JP | 3-225643 | 4/1991 |
| JP | 3-205628 | 9/1991 |
| JP | 4-363649 | 12/1992 |
| JP | 8-167178 | 6/1996 |
| JP | 9-035336 | 2/1997 |
| JP | 11-102542 | 4/1999 |
| JP | 11-300941 | 11/1999 |
| JP | 2000-3531 | 1/2000 |
| JP | 2000-30312 | 1/2000 |
| JP | 2002-92969 | 3/2002 |
| JP | 2004-005836 | 1/2004 |
| JP | 2004-130557 | 4/2004 |

* cited by examiner

MULTILAYERED INFORMATION RECORDING MEDIUM AND PROCESS FOR PRODUCING SAID MULTILAYERED INFORMATION RECORDING MEDIUM, AND APPARATUS FOR PRODUCING MULTILAYERED INFORMATION RECORDING MEDIUM AND SCREEN CONSTITUTING SAID PRODUCTION APPARATUS FOR PRODUCING MULTILAYERED INFORMATION RECORDING MEDIUM

TECHNICAL FIELD

The present invention relates to a multilayer information recording medium for recording information or reproducing information and a method for manufacturing the same.

BACKGROUND ART

In recent years, with an increase in the amount of information processed in information equipment, audiovisual equipment or the like, attention has been directed to an information recording medium such as an optical disk allowing easy data access and capable of storing large volumes of data and responding to the miniaturization of equipment. Also, the higher-density recording of information has been studied. As an information recording medium capable of high-density recording, an information recording medium with respect to which information is recorded and/or reproduced using a recording/reproducing apparatus provided with an optical head including a laser light source with a wavelength of about 400 nm and a focusing lens with a numerical aperture (NA) of 0.85 has been suggested (see Patent document 1, for example). In this information recording medium, it is possible to store data with a capacity of about 25 GB in a single recording layer and about 50 GB in two recording layers, for example.

Now, the structure and manufacturing method of a conventional multilayer information recording medium described in Patent document 1 will be described with reference to FIG. 13A to FIG. 15J.

FIG. 13A to FIG. 13F show a method for manufacturing a substrate production die (stamper) used when producing the conventional multilayer information recording medium. First, a photosensitive material such as photoresist is applied onto a glass plate 201, thereby forming a photosensitive film 202 (see FIG. 13A). Then, using a laser beam 203, an exposure is performed for transferring a pattern of pits and guide grooves to the photosensitive film 202 (see FIG. 13B). In FIG. 13B, numeral 202a denotes a portion irradiated with the laser beam 203 (an exposed portion). The photosensitive material in the exposed portion undergoes a developing process so as to be removed, so that an optical recording master 205 in which a pattern 204 of pits and guide grooves is formed on the glass plate 201 is obtained (see FIG. 13C). Next, an electrically conductive film 206 is formed on the pattern 204 by sputtering, vapor deposition or the like. This transfers the shape of the pattern 204 onto the electrically conductive film 206 (see FIG. 13C and FIG. 13D). Subsequently, a plating film 207 is formed on the electrically conductive film 206, thereby increasing the rigidity and thickness of the electrically conductive film 206 (see FIG. 13E). Thereafter, a laminate of the plating film 207 and the electrically conductive film 206 is peeled off from the optical recording master 205, thus obtaining a stamper 208 (see FIG. 13F).

FIG. 14 is a sectional view showing the conventional multilayer information recording medium. This multilayer information recording medium includes a first signal substrate 301. A first information recording layer 302 is disposed on the first signal substrate 301, and a second signal substrate 303 is disposed on the first information recording layer 302. A second information recording layer 304, a transparent layer 305 and a transparent substrate 306 are disposed in this order on the second signal substrate 303. The transparent layer 305 is provided for attaching the transparent substrate 306 to the second information recording layer 304.

The first signal substrate 301 has a surface with pits and guide grooves serving as an uneven information surface. This information surface is formed when molding the first signal substrate 301 by an injection compression molding using the stamper 208 shown in FIG. 13F. The thickness of the first signal substrate 301 is about 1.1 mm. The first information recording layer 302 and the second information recording layer 304 each include a recording film, a reflecting film, etc., and are formed by sputtering, vapor deposition or the like.

The second signal substrate 303 is formed by attaching a signal transfer substrate having an uneven surface to a photocurable resin applied by spin-coating, curing the photocurable resin and then peeling off the signal transfer substrate from the photocurable resin. The signal transfer substrate has an uneven surface similarly to the stamper 208 shown in FIG. 13F.

The transparent substrate 306 is formed of a material that is adequately transparent to recording light and/or reproducing light. The transparent layer 305 is formed of a photocurable resin and an adhesive such as a pressure-sensitive adhesive. The average thickness of the combination of the transparent substrate 306 and the transparent layer 305 is about 0.075 mm. With respect to such a multilayer information recording medium, information is recorded/reproduced by allowing a recording/reproducing laser beam to enter from the side of the transparent substrate 306.

The following is a more detailed description of the method for manufacturing the conventional multilayer information recording medium with reference to FIG. 15A to FIG. 15J.

First, a first information recording layer 402 is formed on an information surface of a first signal substrate 401 by sputtering, vapor deposition or the like. The first signal substrate 401 is kept fixed to a rotation table 403 by means of a suction device or the like (see FIG. 15A). Next, onto the first information recording layer 402, a coating 404 containing a photocurable resin is applied in such a manner as to form a circle with a desired radius using a dispenser (see FIG. 15B). Then, the rotation table 403 is rotated, thereby spreading the coating 404. At the time of spreading, any excess resin and air bubbles are removed by centrifugal force. The spread coating 404 can be controlled to have a desired thickness by setting the viscosity of the coating 404, the rate of revolutions of the rotation table, the period for rotating the same and the atmospheric conditions (temperature, humidity etc.) as needed. After the rotation, the coating 404 is cured by light irradiation using a light irradiator 405, thus obtaining a photocurable resin layer 404' (see FIG. 15C).

On the other hand, a signal transfer substrate 406 is fixed onto a rotation table 407. The signal transfer substrate 406 has an uneven surface similar to the stamper 208 shown in FIG. 13F (see FIG. 15D). Onto the signal transfer substrate 406, a coating 408 containing a photocurable resin is applied in such a manner as to form a circle with a desired radius using a dispenser. Then, the rotation table 407 is rotated, thereby spreading the coating 408. The thickness of the spread coating 408 can be controlled similarly to the case of the coating 404 (see FIG. 15E). After the rotation table 407 is stopped, the coating 408 is cured by light irradiation using a light irradiator 409, thus obtaining a photocurable resin layer 408' (see FIG. 15F).

Subsequently, on the rotation table 403, a substrate 410 and a substrate 411 are stacked via a coating 412 containing a photocurable resin such that the photocurable resin layers 408' and 404' face each other. In this state, the rotation table 403 is rotated (see FIG. 15G). By the rotation of the rotation table 403, the coating 412 is controlled (spread) to have a desired thickness. Thereafter, the coating 412 is cured by light irradiation using the light irradiator 405, thus obtaining a photocurable resin layer 412' (see FIG. 1511). Then, the signal transfer substrate 406 is peeled off from the photocurable resin layer 408'.

It should be noted that the photocurable resin contained in the coating 404 is selected from resins having an excellent adhesiveness to the first information recording layer 402 and the photocurable resin layer 412'. The photocurable resin contained in the coating 408 is selected from resins having an excellent peelability from the signal transfer substrate 406 and an excellent adhesiveness to the photocurable resin layer 412' (see FIG. 15H). The viscosities of the coatings 404, 412 and 408 are all adjusted to be about 150 mPa·s so that a thin photocurable resin layer can be formed. Incidentally, an integral body of the photocurable resin layers 404', 408' and 412' (also referred to as a resin layer) corresponds to the second signal substrate 303 in FIG. 14. For convenience of description, the above-noted integral body is illustrated to be thicker than the second signal substrate 303 in FIG. 14.

Next, a second information recording layer 413 is formed on a surface of the photocurable resin layer 408' opposite to the side of the first signal substrate 401, namely, a second information surface by sputtering, vapor deposition or the like. On the second information recording layer 413, a coating containing a photocurable resin is applied for forming a transparent layer 415. Then, after a transparent substrate 414 is attached to the applied coating, the rotation table 403 is rotated, thereby removing air bubbles mixed into the coating and spreading the coating. Thereafter, the coating is irradiated with light having a desired wavelength through the transparent substrate 414, thus curing the photocurable resin. Thus, the coating is formed into the transparent layer 415 (see FIG. 15I).

Patent document 1: JP 2002-092969 A

DISCLOSURE OF INVENTION

Problem to be Solved by the Invention

However, when the resin layer, etc. are formed by spin-coating, a slight variation in film thickness in a peripheral direction and a large variation in film thickness in a radial direction are generated. In particular, in a multilayer information recording medium including a large number of information recording layers, the variations in film thickness of the signal substrate (resin layer) disposed between adjacent information recording layers add up to a large variation in thickness for the entire multilayer information recording medium.

Also, in spin-coating, the coating reaches edge portions of the coated surface. Therefore, when curing the photocurable resin by light irradiation, the photocurable resin on the edge portions is mounded by surface tension, so that the photocurable resin layer 404' becomes considerably thicker at the edge portions of the coated surface than at the other portion of the coated surface (see FIG. 15J). Such a variation in thickness causes the variation in thickness of the integral body (resin layer) of the photocurable resin layers 404', 408' and 412'. The variation in thickness of the resin layer leads to a variation in a light spot size due to an increase in a spherical aberration at the time of recording or reproducing information using a laser beam. Furthermore, the above-noted variation in thickness adversely affects a focusing control for maintaining a focus of a light spot on an information surface or a tracking control for allowing the light spot to follow a signal train. As a result, there arises a problem that information cannot be recorded on or reproduced from the multilayer information recording medium excellently.

Further, in order to suppress the above-noted variation in thickness in spin-coating, it is necessary to produce a complicated program for controlling the rotation speed, the number of revolutions and the like of the rotation table. Also, when attempting to suppress the above-noted variation in thickness in spin-coating, there arises a problem in that a tact time increases.

Accordingly, the inventors of the present invention have attempted to apply a screen printing technique instead of spin-coating to the formation of the resin layer. In the following, referring to FIG. 16A to FIG. 16D, the formation of the resin layer using the screen printing technique will be described.

As shown in FIG. 16A, first, a first signal substrate 501 whose surface is provided with a first information recording layer 502 is fixed to a table (not shown) by means of vacuum or the like. Next, a screen, for example, a screen 509 or the like is placed over the first information recording layer 502 with a predetermined clearance therebetween. The screen 509 is fixed to a screen frame 510. Then, a coating containing an ultraviolet curable resin, etc. is supplied to a portion without mesh on the screen 509, and a scraper 507 is slid as shown in FIG. 16B, thereby filling the coating into the mesh of the screen 509. Next, a squeegee 508 is slid on the screen 509 so as to apply a predetermined pressure thereto, whereby the resin-containing coating filled in the mesh of the screen 509 is pushed out of the mesh and applied onto the first information recording layer 502 (see FIG. 16C and FIG. 16D). By replacing the first signal substrate 501 with another and by performing the operations as shown in FIG. 16A to FIG. 16D, a plurality of the first signal substrates 501 applied with coating on the surfaces can be obtained. For a smooth and reliable application, in FIG. 16A, the amount of the coating 511 supplied on the screen 509 is greater than the amount needed for forming one coating layer. Therefore, another coating layer will be formed with the excess coating, or a coating will be added newly so as to form another coating layer.

In such a screen printing, the total of the time for placing the signal substrate and the time for the scraper 507 and the squeegee 508 to slide on the screen corresponds to the tact time for application of the coating. Therefore, the tact time can be shortened more easily in comparison with a spin-coating method.

In this manufacturing method, however, the coating supplied on the screen 509 will be modified due to the sliding of the scraper 507 and the squeegee 508. For the cause of the modification, it is considered for example that the viscosity changes since the coating shifts while holding air in accordance with the sliding of the scraper 507 and the squeegee 508; and the temperature of the coating changes due to the friction generated at the time of sliding the scraper 507 and the squeegee 508. When the viscosity of the coating changes, the thickness of the coating layer may vary between the coating layers. When the thickness of the respective coating layers varies, qualities of the multilayer information recording media may be varied. Thickness may vary also in one coating layer or in one resin layer.

An object of the present invention is to solve the above-mentioned problems. The present invention aims to provide a method for manufacturing a multilayer information recording medium that performs recording and reproduction of information favorably, by enabling to form a resin layer with improved uniformity in thickness.

Means for Solving Problem

A method for manufacturing a multilayer information recording medium of the present invention is a method for manufacturing a multilayer information recording medium comprising at least two information recording portions, a resin layer interposed between the information recording portions, and a signal substrate on which the information recording portions and the resin layer are disposed, the method comprising: a first process of forming a predetermined information recording portion on one principal surface of the signal substrate; and a second process of passing a part of a resin-containing coating, which is supplied on a screen having an application region with a plurality of first pores and a removal region with a plurality of second pores, through the first pores by sliding a squeegee on the screen so as to form a coating layer on the predetermined information recording portion, and curing the resin contained in the coating layer so as to form the resin layer; wherein the first process and second process are repeated respectively a predetermined number of times, and in every second process, at least a part of the resin-containing coating that has not been applied on the predetermined information recording portion and that remains on the screen is removed from the screen surface by passing through the second pores.

A multilayer information recording medium of the present invention is characterized in that it is manufactured by the method of the present invention for manufacturing a multilayer information recording medium.

An apparatus for manufacturing a multilayer information recording medium of the present invention is an apparatus for manufacturing a multilayer information recording medium comprising at least two information recording portions, a resin layer interposed between the information recording portions, and a signal substrate on which the information recording portions and the resin layer are disposed, the apparatus comprising: an information-recording-portion forming unit for forming the information recording portions, and a resin-layer forming unit for forming the resin layer; the resin-layer forming unit comprises a printing section and a resin-curing section; where the printing section comprises: a screen comprising an application region with a plurality of first pores and a removal region with a plurality of second pores, a coating-supplying portion enabling supply of the resin-containing coating on the screen, and a squeegee having capability of sliding on the screen, and sliding on the screen to allow the resin-containing coating supplied on the screen by the coating-supplying portion to pass the first pores so as to form a coating layer on the information recording portion; and the resin-curing section has a capability of curing the resin contained in the coating layer, wherein the removal region allows at least a part of the resin-containing coating that has not been applied on the information recording portion and that remains on the screen, to pass through the second pores so as to remove the resin-containing coating from the screen surface.

A screen of the present invention is used for manufacturing a multilayer information recording medium of the present invention, which comprises an application region with a plurality of first pores so that at least a part of the resin-containing coating supplied on the screen passes through the first pores so as to be applied on the information recording portion; and a removal region with a plurality of second pores so that at least a part of the resin-containing coating that has not been applied on the information recording portions and that remains on the screen passes through the second pores so as to be removed from the screen surface.

A method of the present invention is a method for manufacturing continuously a plurality of multilayer information recording media each having at least two information recording portions, a resin layer interposed between the information recording portions, and a signal substrate on which the information recording portions and the resin layer are disposed, the method comprising: a process of forming a predetermined information recording portion on one principal surface of the signal substrate; and a process of forming a resin layer, the process including passing a part of a resin-containing coating, which is supplied on a screen having an application region with a plurality of first pores and a removal region with a plurality of second pores, through the first pores by sliding a squeegee on the screen so as to form a coating layer on the predetermined information recording portion, and curing the resin contained in the coating layer; wherein the process of forming information recording portions and the process of forming the resin layer are repeated respectively a predetermined number of times in order to manufacture respective multilayer information recording media; and at least a part of the resin-containing coating that has not been applied on the respective information recording portions and that remains on the screen is passed through the second pores every time one or a plurality of coating layer(s) is/are formed or during formation of another coating layer, so that the part of the resin-containing coating is removed from the screen surface.

EFFECTS OF THE INVENTION

According to the present invention, by realizing formation of a resin layer with excellent uniformity in thickness, a multilayer information recording medium with excellent performance in recording information or reproducing information can be provided. And it is possible to suppress the variation in quality for a plurality of multilayer information recording media.

Figure 1:
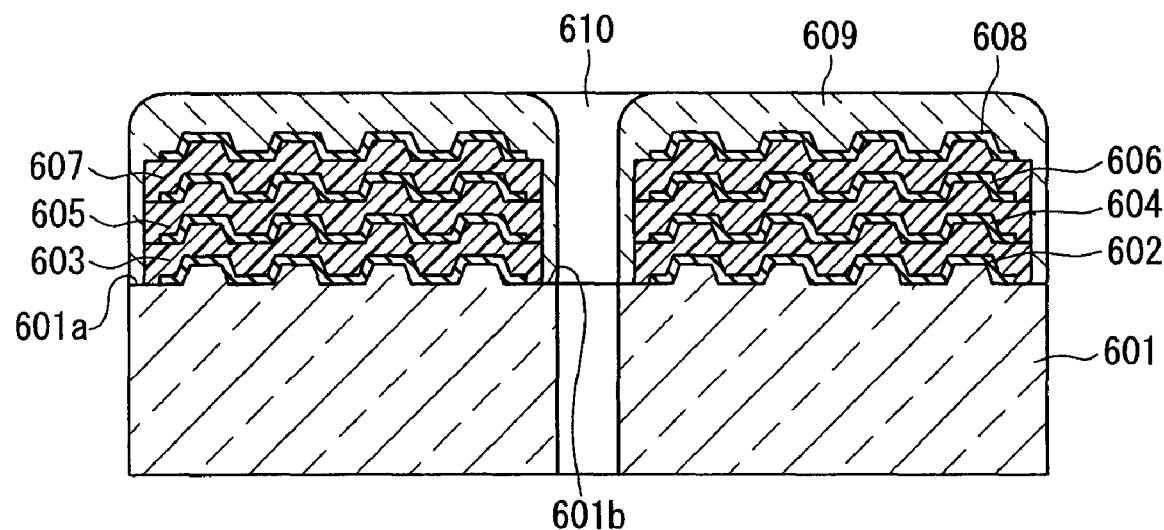
FIG. 1 is a sectional view showing an example of a multilayer information recording medium according to the present invention.

EXPLANATION OF LETTERS AND NUMERALS 101, 901, 1001, 701e squeegee
102, 902, 1002 screen frame
103, 903, 1003, 701c resin-containing coating
104, 904, 1004, 701b screen
106, 906, 1006 application region
107, 907, 1007 removal region
108, 908, 1008, 701f container
109, 909, 1009, 708 table
110, 910, 1010 coating layer
914 removal auxiliary region
601 first signal substrate
602 first information recording portion
603 second signal substrate (resin layer)
604 second information recording portion
605 third signal substrate (resin layer)
606 third information recording portion
607 fourth signal substrate (resin layer)
608 fourth information recording portion 609 transparent layer
801 decompression chamber
802 signal transfer substrate
803 pressure-reducing pump
804 pressing plate
805, 712 light irradiator
701 printing section
702 signal transfer section
703 resin-curing section
704 peeling section
705 information-recording-portion forming unit
706 transparent-layer forming unit
707 resin-layer forming unit

DESCRIPTION OF THE INVENTION

In one preferred example of the method for manufacturing a multilayer information recording medium of the present invention, a resin-containing coating removed from a screen is recycled and newly supplied on the screen.

In one preferred example of the method for manufacturing a multilayer information recording medium of the present invention, the screen further has a removal auxiliary region that is disposed on the periphery of an application region along the traveling direction of a squeegee, and the removal auxiliary region has a plurality of third pores.

Alternatively, the screen has further a pair of removal auxiliary regions disposed to sandwich the application region and each of the removal auxiliary regions has a plurality of third pores. When the screen has a removal auxiliary region as in this example, it is preferable that the removal region and the removal auxiliary region are connected to each other.

In one preferred example of the method for manufacturing a multilayer information recording medium of the present invention, in the second process, the screen is inclined with respect to a horizontal plane so that the removal region will be positioned lower than the application region. Corresponding to the screen, a predetermined information recording portion is inclined as well. In this state, the resin-containing coating is applied to the predetermined information recording portion.

In one preferred example of the method for manufacturing a multilayer information recording medium of the present invention, the resin contained in the resin-containing coating is a photocurable resin for example. It is preferable that the photocurable resin is an ultraviolet curable resin. It is preferable that the resin-containing coating includes at least any one of a surfactant and a defoamer.

In one preferred example of the method for manufacturing a multilayer information recording medium of the present invention, in the second process, a signal transfer substrate having an uneven surface and a signal substrate are attached to each other via a coating layer, and subsequently the resin contained in the coating layer is cured to form a resin layer. After curing the resin contained in the coating layer, the signal transfer substrate is peeled off from the resin layer. In such a case, it is preferable that the signal transfer substrate and the signal substrate are attached to each other at a pressure lower than atmospheric pressure. It is preferable that the signal transfer substrate includes a polyolefin resin.

Since the exemplified multilayer information recording medium of the present invention is manufactured by one exemplified manufacturing method of the present invention, the uniformity in the resin thickness is excellent. Accordingly, the variation in an optical path length is small. Here, the optical path length denotes the distance from the surface of the multilayer information recording medium through which light (recording light, reproduction light) enters to each information recording portion. Therefore, in such an example of the multilayer information recording medium of the present invention, variations in the size of the light spot caused by the increase in the spherical aberration are suppressed, and thus the focus control and the tracking control can be performed stably.

In one preferred example of the apparatus for manufacturing a multilayer information recording medium of the present invention, a printing section constituting the apparatus for manufacturing a multilayer information recording medium includes a container that can hold the resin-containing coating removed from the screen surface.

In one preferred example of the apparatus for manufacturing a multilayer information recording medium of the present invention, a resin-layer forming unit includes further a signal transfer section including a signal transfer substrate and also a peeling section for peeling the signal transfer substrate from the resin layer. The signal transfer substrate having an uneven surface serving as an information surface is attached to a coating layer so that the information surface can be transferred to the coating layer.

In one preferred example of the apparatus for manufacturing a multilayer information recording medium of the present invention, a resin-layer forming unit includes a table to which the signal substrate can be fixed removably.

In one preferred example of the apparatus for manufacturing a multilayer information recording medium of the present invention, the screen is inclined with respect to a horizontal plane so that the removal region is positioned lower than the application region, and the table is inclined corresponding to the screen.

In one preferred example of the apparatus for manufacturing a multilayer information recording medium of the present invention, the resin-curing section includes a light irradiator. This light irradiator has a capability of irradiating ultraviolet light.

One preferred example of the apparatus for manufacturing a multilayer information recording medium of the present invention includes a recycling mechanism for recycling the resin-containing coating removed from the screen surface and stored in a container, and allowing the recycled resin-containing coating to be supplied to a coating-supplying portion.

In one preferred example of the apparatus for manufacturing a multilayer information recording medium of the present invention, the screen has a removal auxiliary region that is disposed on the periphery of the application region along the traveling direction of the squeegee, and the removal auxiliary region has a plurality of third pores.

In one preferred example of the apparatus for manufacturing a multilayer information recording medium of the present invention, the screen has a pair of removal auxiliary regions disposed to sandwich the application region, and each of the removal auxiliary regions has a plurality of third pores.

In one preferred example of the apparatus for manufacturing a multilayer information recording medium of the present invention, the removal region and the removal auxiliary region are connected to each other.

In one preferred example of a method for continuously manufacturing a plurality of multilayer information recording media of the present invention, a resin-containing coating is supplied newly on the screen every time one coating layer is formed.

In one preferred example of a method for continuously manufacturing a plurality of multilayer information recording media of the present invention, the distance for sliding the squeegee is changed periodically.

Hereinafter, embodiments of the present invention will be described with reference to the attached drawings. Although disc-shaped information recording media are referred to as the examples for the multilayer information recording media in the embodiments, the multilayer information recording media in the present invention will not be limited thereto. For example, information recording media such as memory cards are applicable as well.

Embodiment 1

Embodiment 1 refers to an example of a method for manufacturing a multilayer information recording medium of the present invention, and an example of a multilayer information recording medium manufactured by this method, which are explained with reference to FIG. 1 to FIG. 5D.

FIG. 1 is a sectional view showing an example of a multilayer information recording medium of the present invention. As shown in FIG. 1, the multilayer information recording medium includes a first signal substrate 601, and a first information recording portion 602 disposed on an information surface of the first signal substrate 601. The first signal substrate 601 has a surface formed with pits and/or guide grooves, as an information surface of an uneven shape. The multilayer information recording medium includes also a second signal substrate 603 disposed on the first information recording portion 602. The second signal substrate 603 has a surface formed with pits and/or guide grooves as an information surface of an uneven shape (a surface opposite to the side of the first signal substrate 601). The multilayer information recording medium includes a second information recording portion 604 disposed on this information surface. The multilayer information recording medium includes a third signal substrate 605 disposed on the second information recording portion 604. The third signal substrate 605 has a surface formed with pits and/or guide grooves as an information surface of an uneven shape (a surface opposite to the side of the second signal substrate 603). The multilayer information recording medium includes a third information recording portion 606 disposed on this information surface. The multilayer information recording medium includes a fourth signal substrate 607 disposed on the third information recording portion 606. The fourth signal substrate 607 has a surface formed with pits and/or guide grooves as an information surface of an uneven shape (a surface opposite to the side of the third signal substrate 605). The multilayer information recording medium includes a fourth information recording portion 608 disposed on this information surface and a transparent layer 609 disposed on the fourth information recording portion 608.

In the present application, the second to fourth signal substrates 603, 605 and 607 may be denoted also as resin layers 603, 605 and 607, and the first signal substrate 601 may be denoted simply as a signal substrate 601.

The first signal substrate 601 is formed of a disc φ120 mm in outer diameter and about 1.0 to about 1.1 mm in thickness for the purpose of suppressing warping of the multilayer information recording medium, enhancing the rigidity of the multilayer information recording medium, and for ensuring compatibility with other optical discs (such as CD and DVD). For the material of the first signal substrate 601, for example, polycarbonate and acrylic resin can be applied. In the multilayer information recording medium shown in FIG. 1, polycarbonate is used for the material of the first signal substrate 601.

Figure 13A:
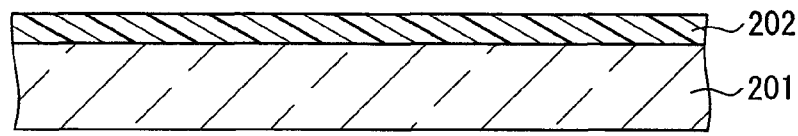
FIG. 13A is a sectional view of a process for describing an example of a method for manufacturing a substrate production die used when producing a conventional multilayer information recording medium.
Figure 13B:
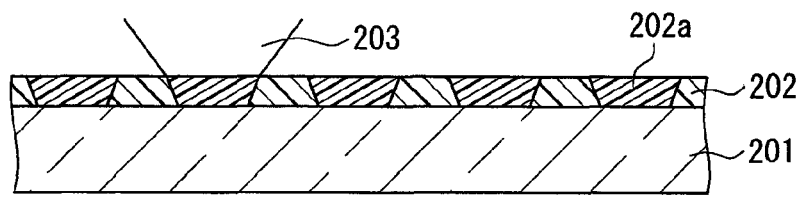
FIG. 13B is a sectional view of a process for describing an example of a method for manufacturing a substrate production die used when producing a conventional multilayer information recording medium.
Figure 13C:
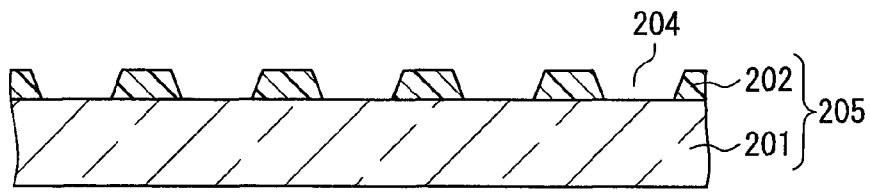
FIG. 13C is a sectional view of a process for describing an example of a method for manufacturing a substrate production die used when producing a conventional multilayer information recording medium.
Figure 13D:
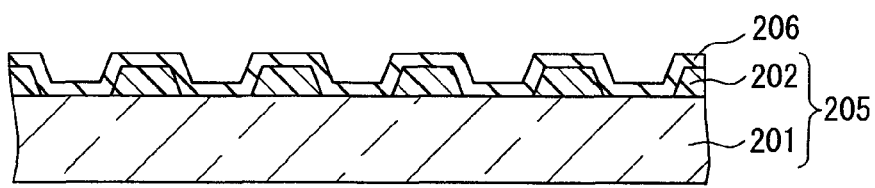
FIG. 13D is a sectional view of a process for describing an example of a method for manufacturing a substrate production die used when producing a conventional multilayer information recording medium.
Figure 13E:
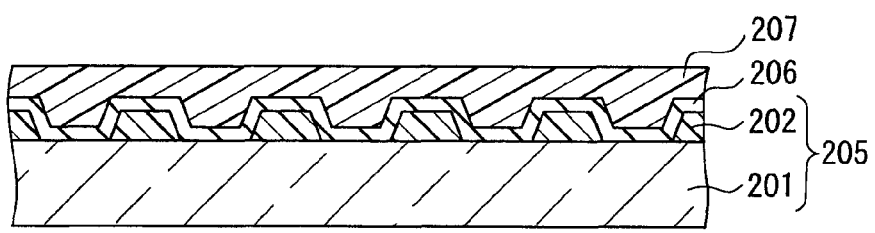
FIG. 13E is a sectional view of a process for describing an example of a method for manufacturing a substrate production die used when producing a conventional multilayer information recording medium.
Figure 13F:
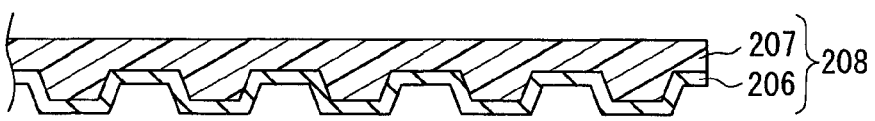
FIG. 13F is a sectional view of a process for describing an example of a method for manufacturing a substrate production die used when producing a conventional multilayer information recording medium.
Figure 14:
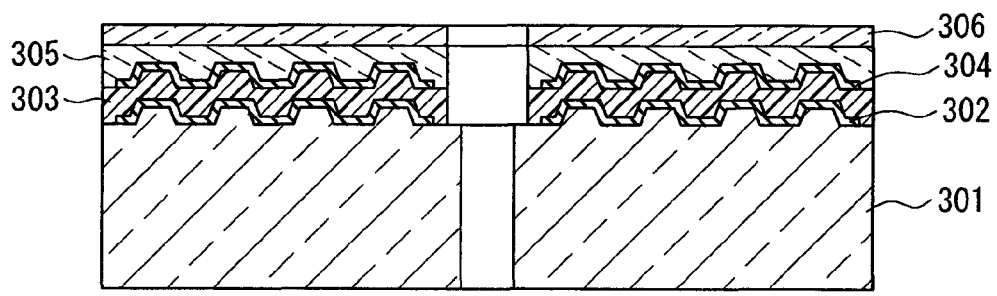
FIG. 14 is a sectional view showing an example of a conventional multilayer information recording medium.
Figure 15A:
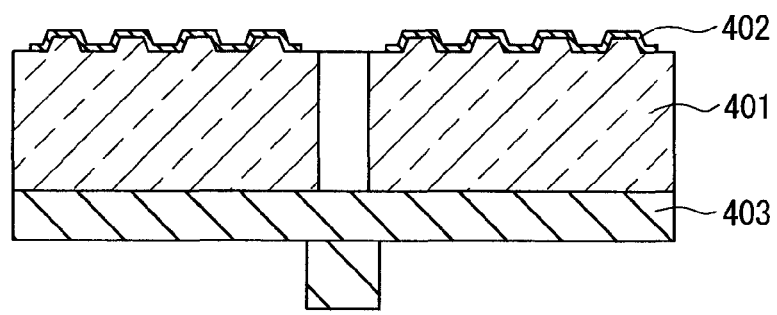
FIG. 15A is a sectional view of a process for describing an example of a method for manufacturing a conventional multilayer information recording medium.
Figure 15B:
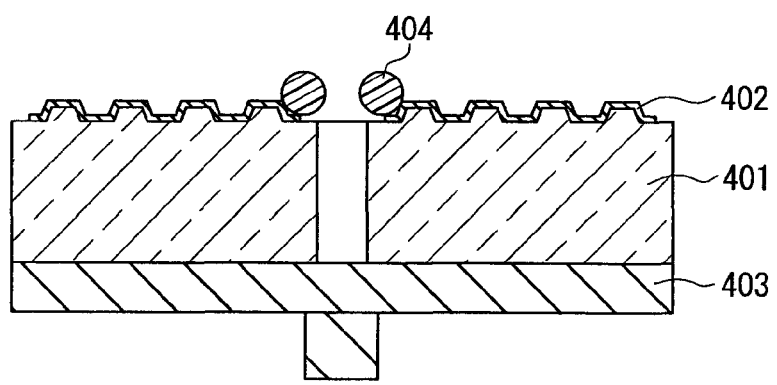
FIG. 15B is a sectional view of a process for describing an example of a method for manufacturing a conventional multilayer information recording medium.
Figure 15C:
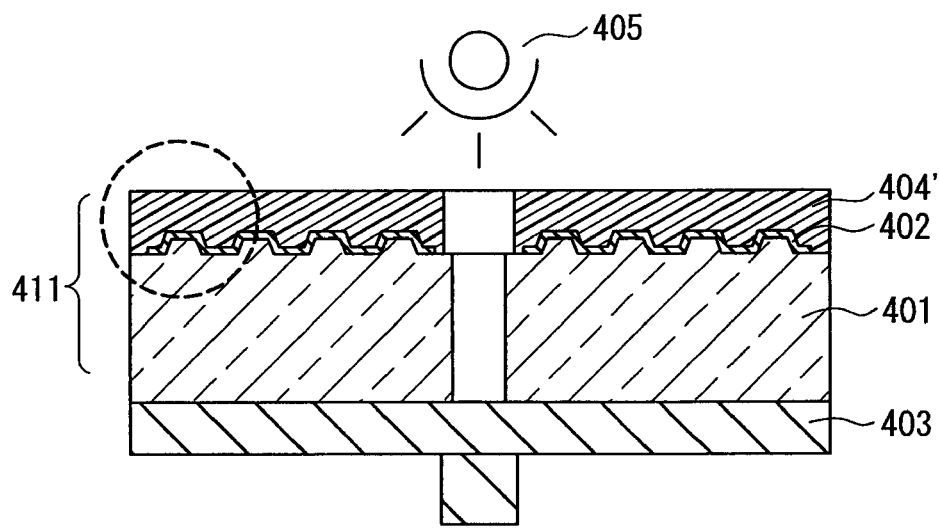
FIG. 15C is a sectional view of a process for describing an example of a method for manufacturing a conventional multilayer information recording medium.
Figure 15D:
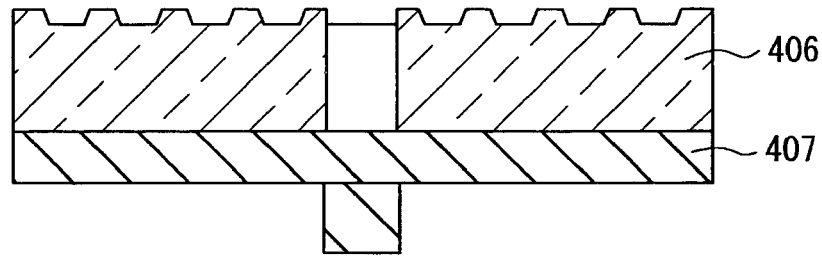
FIG. 15D is a sectional view of a process for describing an example of a method for manufacturing a conventional multilayer information recording medium.
Figure 15E:
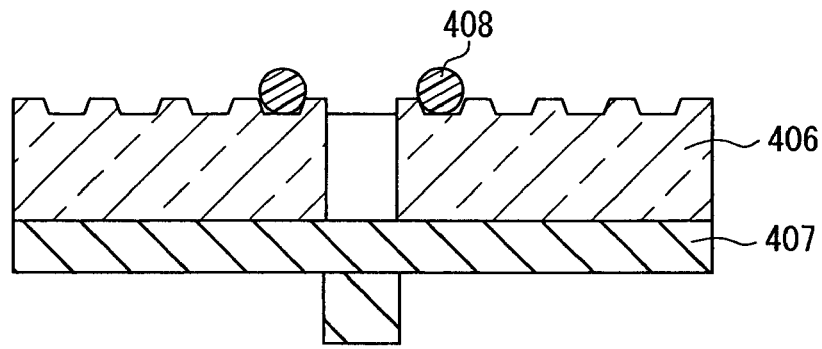
FIG. 15E is a sectional view of a process for describing an example of a method for manufacturing a conventional multilayer information recording medium.
Figure 15F:
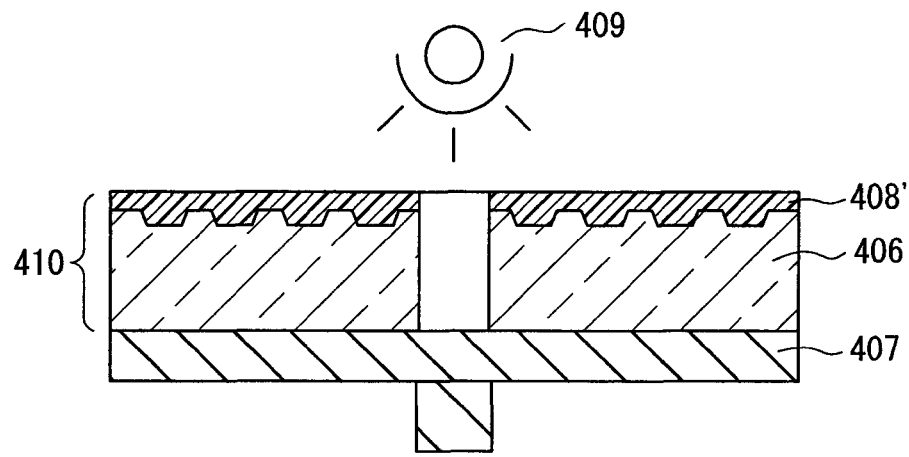
FIG. 15F is a sectional view of a process for describing an example of a method for manufacturing a conventional multilayer information recording medium.
Figure 15G:
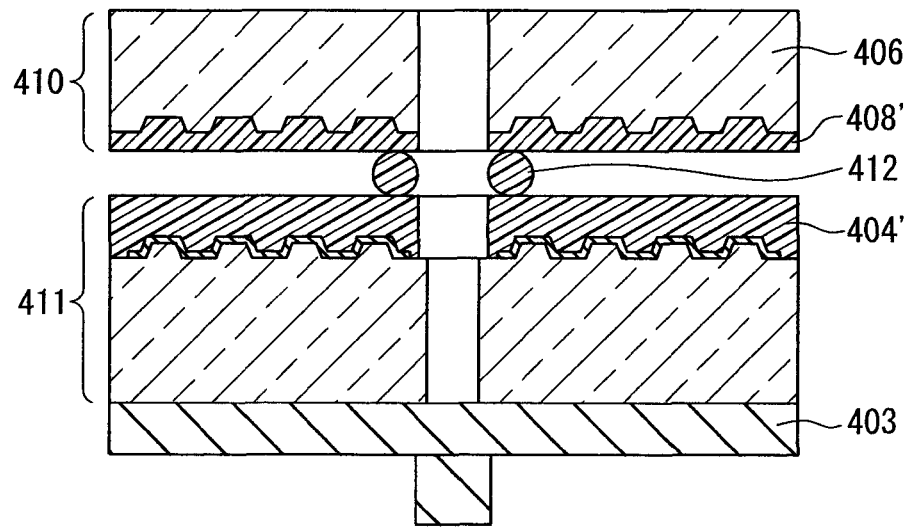
FIG. 15G is a sectional view of a process for describing an example of a method for manufacturing a conventional multilayer information recording medium.
Figure 15H:
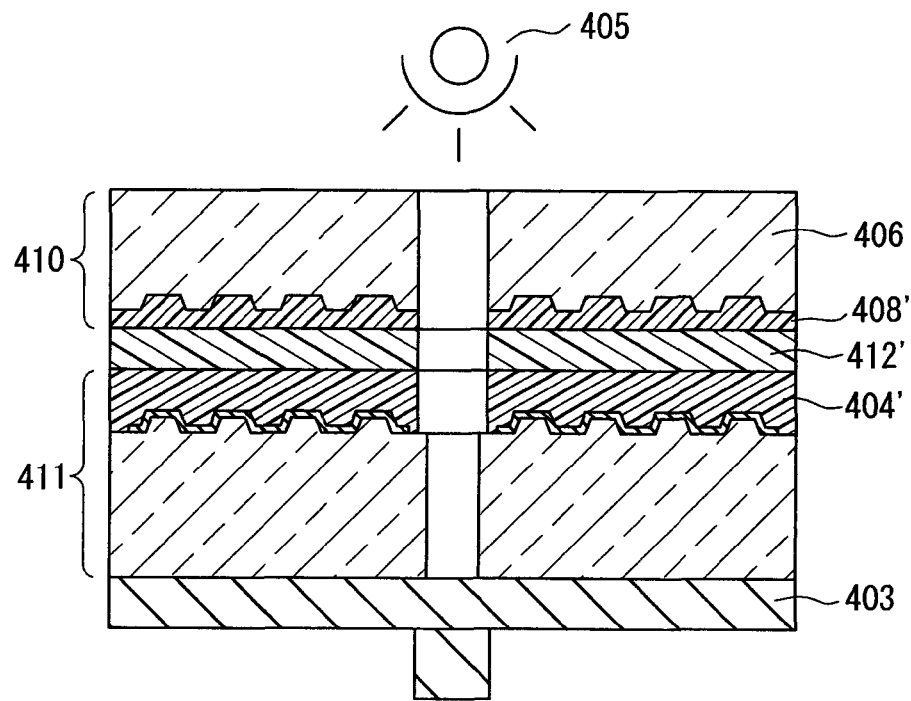
FIG. 15H is a sectional view of a process for describing an example of a method for manufacturing a conventional multilayer information recording medium.
Figure 15I:
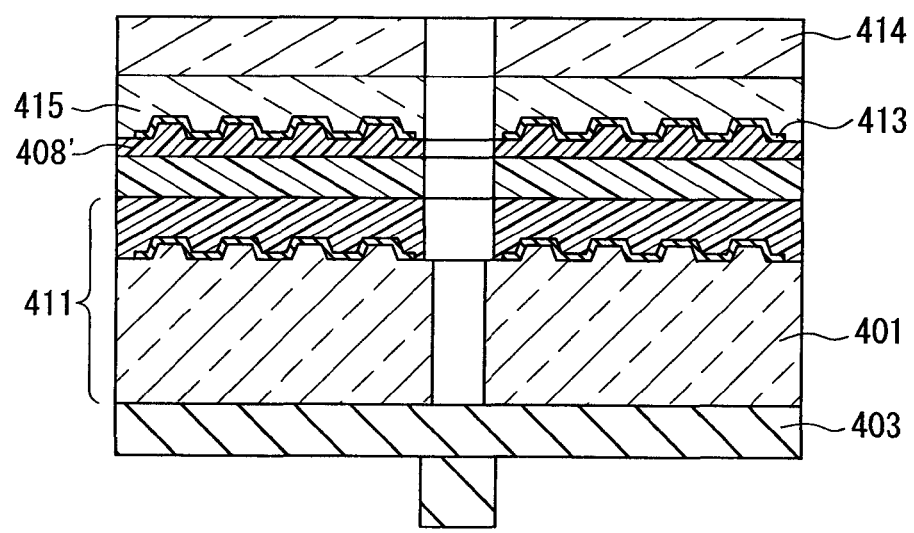
FIG. 15I is a sectional view of a process for describing an example of a method for manufacturing a conventional multilayer information recording medium.
Figure 15J:
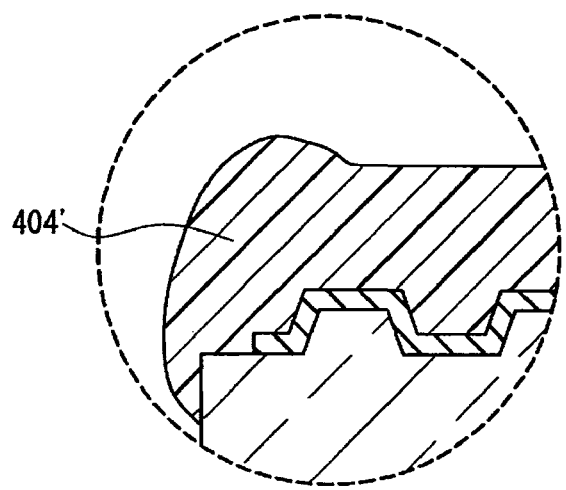
FIG. 15J is a partially enlarged view of FIG. 15C.
Figure 16A:
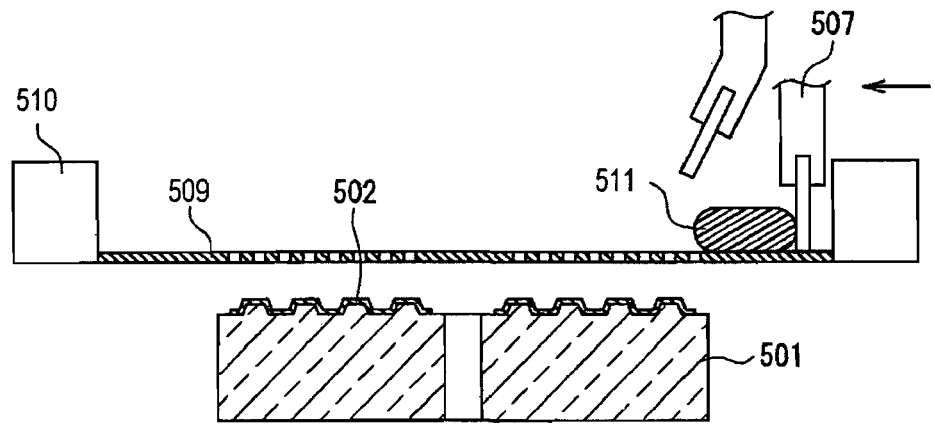
FIG. 16A is a sectional view for describing another example of a method for manufacturing a conventional multilayer information recording medium.
Figure 16B:
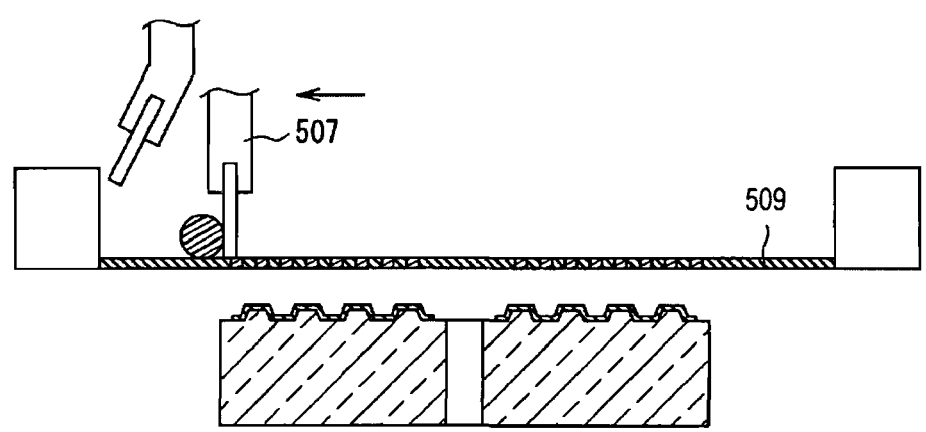
FIG. 16B is a sectional view for describing another example of a method for manufacturing a conventional multilayer information recording medium.
Figure 16C:
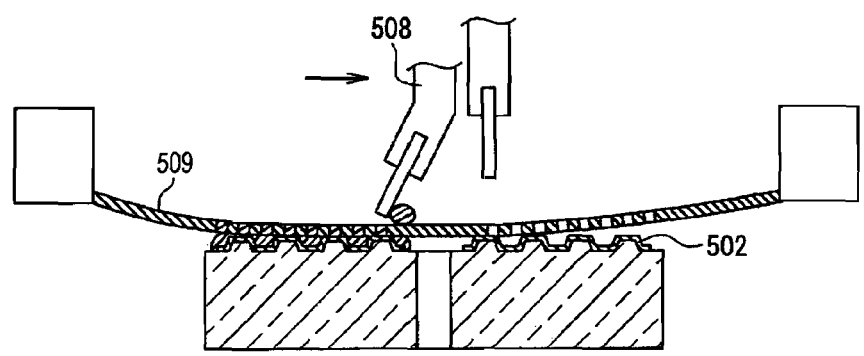
FIG. 16C is a sectional view for describing another example of a method for manufacturing a conventional multilayer information recording medium.
Figure 16D:
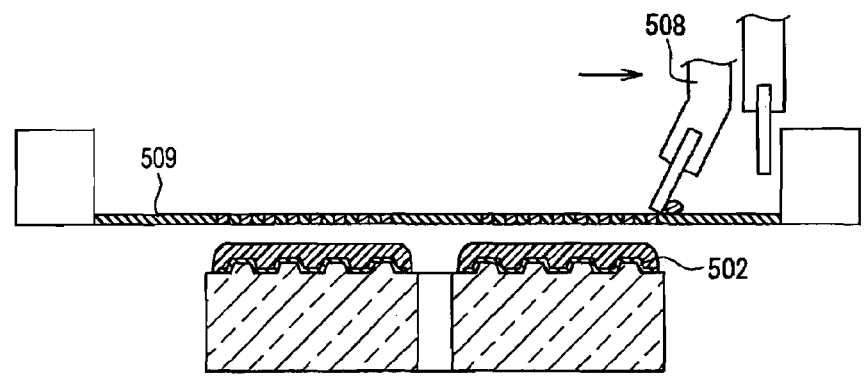
FIG. 16D is a sectional view for describing another example of a method for manufacturing a conventional multilayer information recording medium.

The uneven information surface is formed at the same time of molding the first signal substrate 601 by using the stamper 208 as shown in FIG. 13F for example. The first signal substrate 601 can be formed, for example, by a molding method such as an injection compression molding. The first signal substrate 601 has a center hole 610 formed at the center, and the diameter of the center hole 610 is φ15 mm. With the center hole 610, during recording and reproduction of information by a player, the multilayer information recording medium is retained rotatably at a predetermined position of the player.

When the resin layers 603, 605 and 607 and the transparent layer 609 to be formed on the first signal substrate 601 contain a photocurable resin, photocuring shrinkage occurs during formation of these layers. The photocuring shrinkage will cause warping in the first signal substrate 601. Therefore, it is preferable that the first signal substrate 601 is formed in advance to warp in a direction opposite to the warping caused by the photocuring shrinkage so that the multilayer information recording medium is prevented from warping after formation of the resin layers 603, 605, 607 and the transparent layer 609.

When the multilayer information recording medium of the present embodiment is a multilayer information recording medium, namely a read-only memory (ROM), the first information recording portion 602 is made of metals such as Al, Ag, Au, Si and $SiO_2$, a semiconductor and a dielectric, and by a method such as sputtering and vapor deposition.

Figure 2:
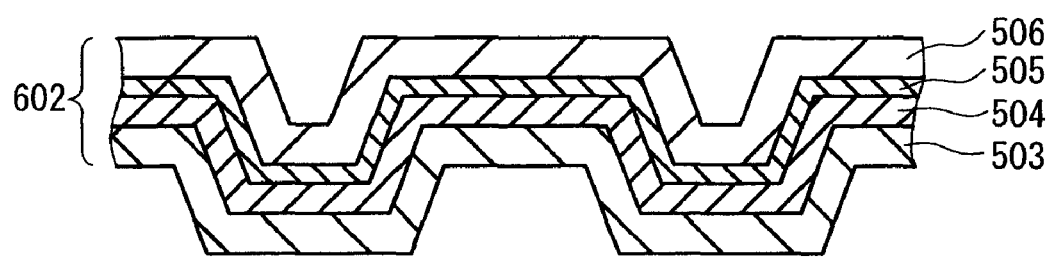
FIG. 2 is a sectional view showing a first information recording portion constituting the multilayer information recording medium shown in FIG. 1.

Next, the configuration of the first information recording portion 602 in a case where the multilayer information recording medium of the present embodiment is a Write-Once type multilayer information recording medium is described with reference to FIG. 2.

The first information recording portion 602 is formed of, for example, a reflecting film 503 of AlCr, a first dielectric film 504 of ZnS, a recording film 505 of TeOPd, and a second dielectric film 506 of ZnS, which are disposed in this order from the side of the first signal substrate 601 (see FIG. 1). These layers are formed respectively by a method such as sputtering and vapor deposition. The material of the reflecting film 503 is not limited to AlCr, but a material based on a metal such as Ag and Au can be used, similarly to the case of a multilayer information recording medium for read-only.

The second information recording portion 604, the third information recording portion 606 and the fourth information recording portion 608 are configured similarly to the first information recording portion 602. The optical properties of the multilayer information recording medium can be adjusted by adjusting the thickness of the reflecting film 503, removing the reflecting film 503, and/or adjusting the thickness of the first dielectric film 504 and the recording film 505. The first to fourth information recording portions can include further a coloring film (not shown) or the like.

The resin layers 603, 605 and 607 are substantially transparent to the recording-reproducing light. Preferably the resin layer 603 is formed of an ultraviolet curable resin based on an acrylic resin, since such an ultraviolet curable resin will be cured due to reaction with high sensitivity to only light having a wavelength in the ultraviolet range.

Next, an example of a method for manufacturing the multilayer information recording medium shown in FIG. 1 will be described with reference to FIG. 3A to FIG. 5D.

Figure 3A:
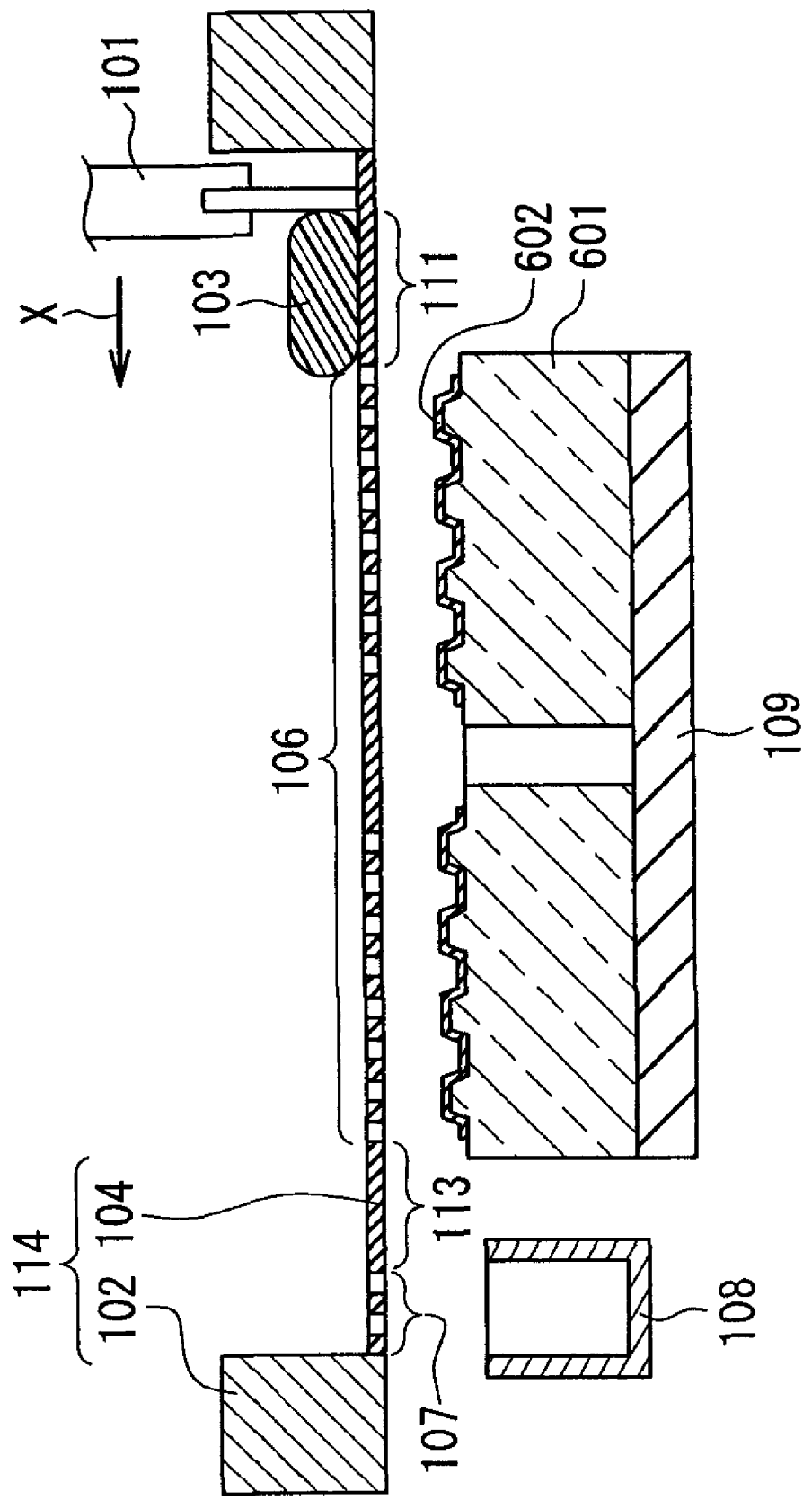
FIG. 3A is a sectional view of a process for describing an example of a method for manufacturing the multilayer information recording medium shown in FIG. 1, showing a state just before application of a resin-containing coating.
Figure 3B:
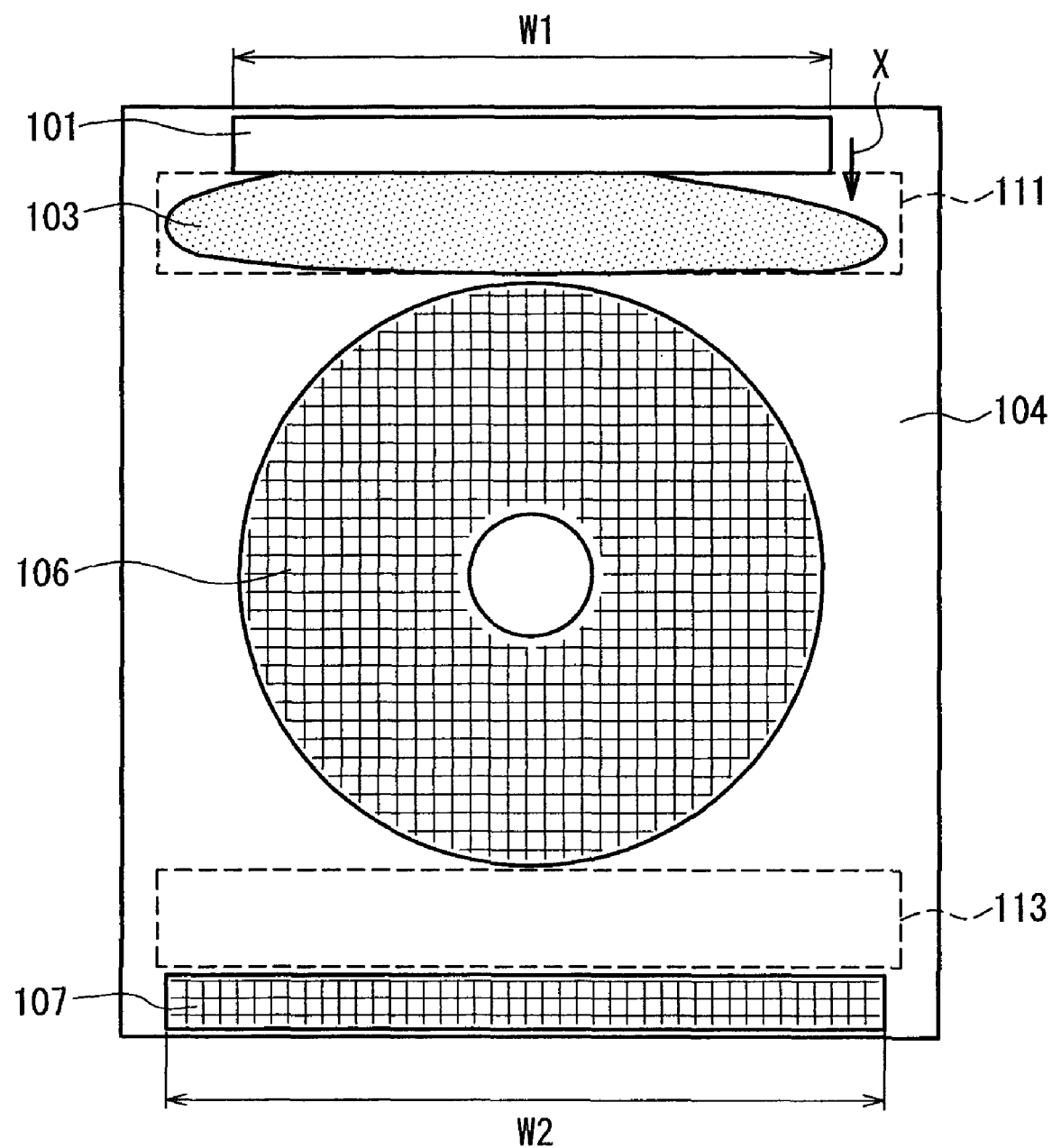
FIG. 3B is a plan view showing the screen and the squeegee shown in FIG. 3A.
Figure 4A:
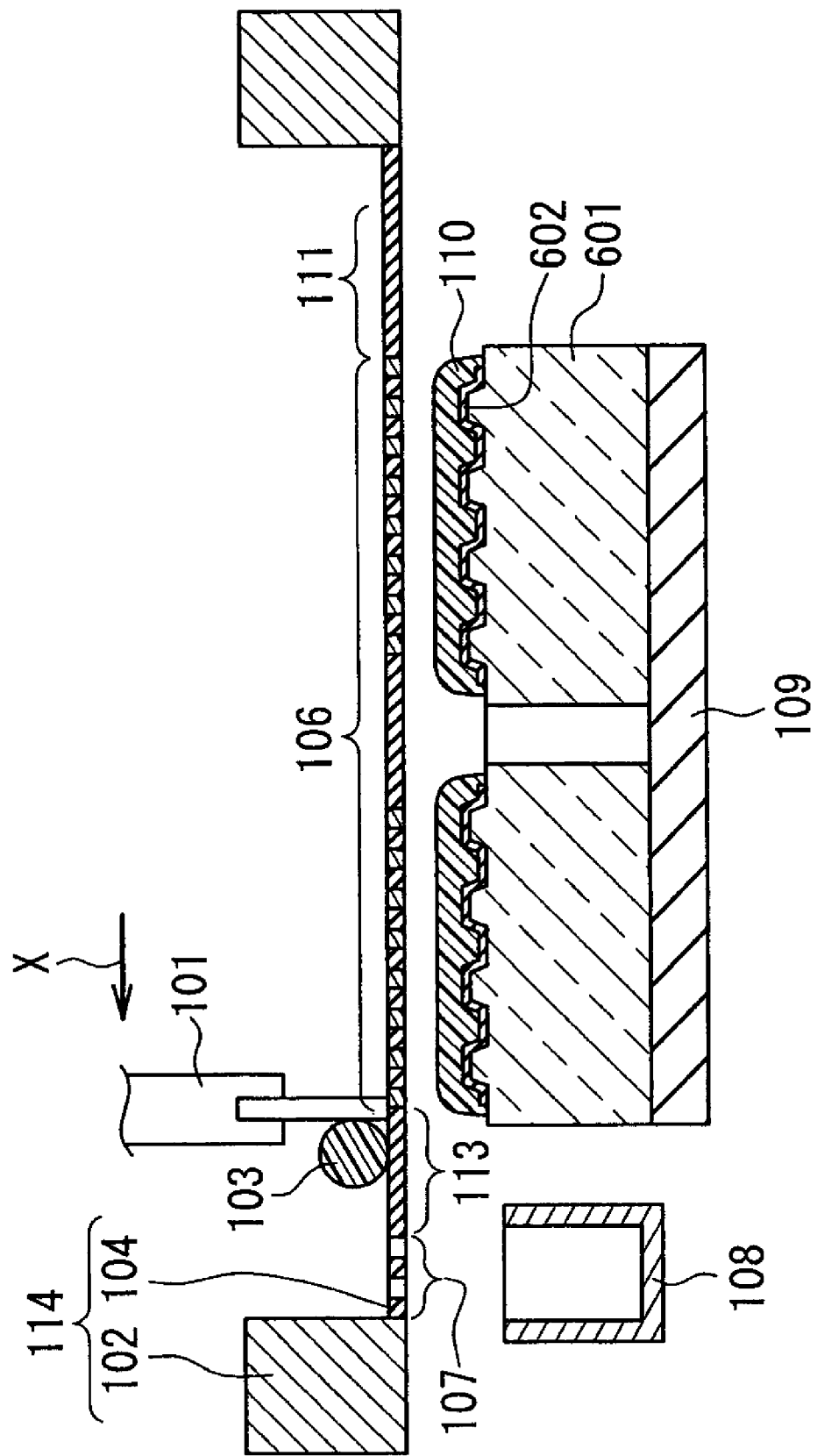
FIG. 4A is a sectional view of a process for describing an example of a method for manufacturing the multilayer information recording medium shown in FIG. 1, showing a state just after application of a resin-containing coating.
Figure 4B:
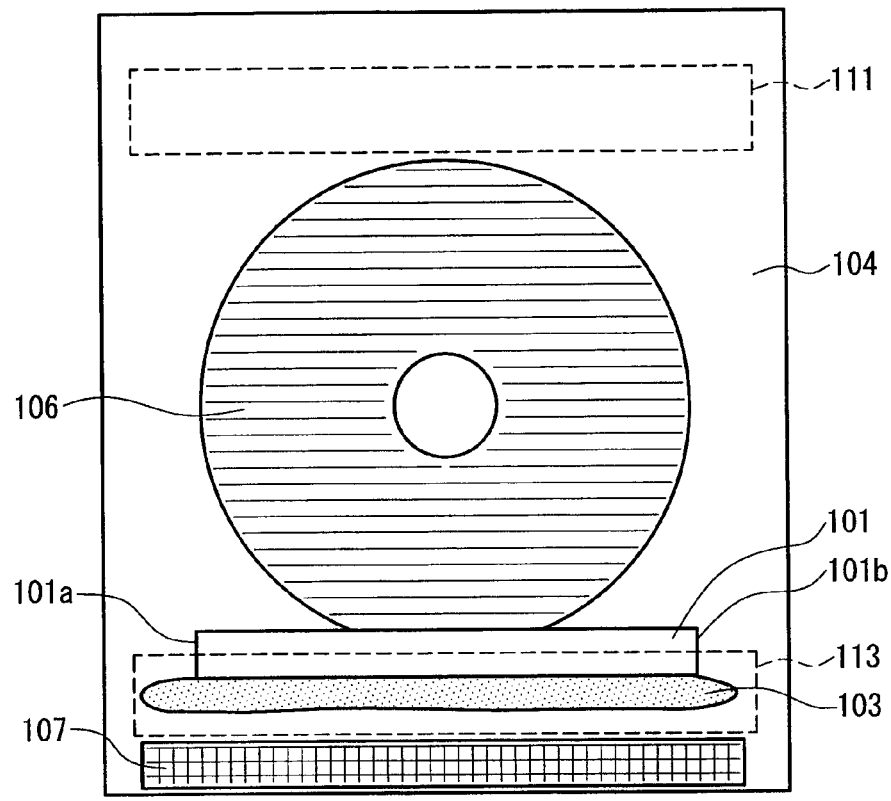
FIG. 4B is a plan view showing the screen and the squeegee shown in FIG. 4A.

FIG. 3A and FIG. 4A are sectional views of a process for describing an example of a method for manufacturing a multilayer information recording medium of the present embodiment. FIG. 3A shows the state just before application of resin, and FIG. 4A shows the state just after application of resin. FIG. 3B is a plan view showing the screen and the squeegee just before the application of resin, and FIG. 4B is a plan view showing the screen and the squeegee just after the application of resin.

In these figures, numeral 101 denotes a squeegee, 102 denotes a screen frame, 103 denotes a resin-containing coating that contains an ultraviolet curable resin, 104 denotes a screen, 601 denotes a first signal substrate, 106 denotes an application region, 107 denotes a removal region for removing excess resin-containing coating, 111 denotes a coating-temporarily-retaining region, 108 denotes a container for holding an excess resin-containing coating removed from the screen 104, numeral 109 denotes a table, 110 denotes a coating layer formed by applying the resin-containing coating, and 602 denotes a first information recording portion. The resin-containing coating 103 can contain a solvent for viscosity adjustment, a curing initiator or the like as well as a resin such as the ultraviolet curable resin. For the solvent for viscosity adjustment, for example, toluene, methyl ethyl ketone (MEK) and the like can be used.

In the method for manufacturing the multilayer information recording medium of the present embodiment, first, the first information recording portion 602 including the recording film, reflecting film and the like is formed on the information surface of the first signal substrate 601 (first process). The recording film 505 (see FIG. 2), the reflecting film 503 (see FIG. 2) and the like constituting the first information recording portion 602, are formed respectively by a method such as sputtering and vapor deposition. The first signal substrate 601 is fixed to the table 109 by a system such as vacuum as required.

Next, the resin layer 603 is formed on the first information recording portion 602 (second process). The second process includes the following steps.

First, on the first signal substrate 601 on which the first information recording portion 602 is formed, a screen 104 having a mesh of a predetermined dimension is disposed with a predetermined clearance therebetween. The clearance is not limited particularly as long as the resin-containing coating is applied suitably. Though the clearance is changed depending on the viscosity or the like of the resin-containing coating, it is suitably in a range of 1 mm to 5 mm in general.

The screen 104 has the coating-temporarily-retaining region 111, the application region 106 and the removal region 107. These regions are present in this order along the traveling direction X of the squeegee 101. Here, the traveling direction X of the squeegee 101 denotes the direction that the squeegee 101 moves when applying the resin-containing coating on the information recording portion.

The coating-temporarily-retaining region 111 is a region for temporarily retaining the resin-containing coating 103. The application region 106 has a plurality of first pores penetrating in the thickness direction of the screen 104. The first pores constitute a mesh for example, and the resin-containing coating passing through this mesh is applied onto a matter to be printed (information recording portion). By adjusting the dimension of the respective first pores and the number of the first pores for example, the application amount can be adjusted suitably. The removal region 107 has a plurality of second pores penetrating in the thickness direction of the screen 104. The second pores also constitute a mesh for example. The remaining resin-containing coating that has not been applied on the information recording portion passes through the second pores so as to be removed from the surface of the screen 104.

A screen member 114 formed by fixing the screen 104 to the screen frame 102 is produced for example in the following manner.

First, on the screen frame 102, a porous material or the like having a plurality of pores (a mesh for example) is stuck, and the porous material is coated with a photosensitive emulsion. Subsequently, the coated porous material is covered with a shielding mask except for a part for forming the application region 106 and a part for forming the removal region 107. Subsequently, the porous material is irradiated with ultraviolet light for a certain period by using an exposing device. The parts exposed by the ultraviolet irradiation are developed by rinsing with water injection or the like, and thereby the screen member 114 can be obtained. The screen member 114 includes the screen 104 that has the application region 106 and the removal region 107 and that is fixed to the screen frame 102.

For the material of the screen frame 102, for example, lumber, aluminum, stainless steel, and plastics can be used. Among them, aluminum is preferred due to its light-weight and high rigidity. For the porous material, for example, silk, nylon (registered trademark), polyester, polyarylate, stainless steel and the like can be used. Among them, polyester is preferred from the viewpoint of decreasing the load imposed by friction or the like on the matter to be printed. From the viewpoint of excellent stability against external pressure, polyarylate is preferred.

An example that can be used for the photosensitive emulsion is prepared by mixing and dissolving either diazonium salt or dichromate in either PVA or vinyl acetate emulsion. It is preferable that the number of meshes (the number of wires per inch) in the application region 106 and in the removal region 107 of the screen 104 is in a range of 100 to 600. It is preferable that the width of the wire is in a range of 20 μm to 100 μm. When the number of meshes and the width of the wires are within these ranges, the resin-containing coating can be applied without causing problems such as unsatisfactory passing or nonuniform application of the resin-containing coating. It should be noted that the first pores and the second pores are not limited to meshes.

Hereinafter, the second process will be described more specifically by referring to an example where aluminum is used for the screen frame 102 and a porous material of polyester is used for the screen. It should be noted that similar effects are obtained even when other materials are used for the screen frame 102 and the screen 104.

First, as shown in FIG. 3A and FIG. 3B, the resin-containing coating 103 is dropped on the coating-temporarily-retaining region 111 of the screen 104. The dropping is carried out, for example, by a dispenser or the like. The amount of dropping of the resin-containing coating 103 is not limited particularly as long as an amount required for forming one coating layer (that will be cured to form a resin layer) is provided, but preferably, the dropping amount exceeds the level required for forming one coating layer so that the application is carried out smoothly and reliably. If the resin-containing coating of an amount more than the level required to form one coating layer is supplied at one time, there would be no necessity of newly supplying the resin-containing coating after forming the coating layer. At least one separate coating layer can be formed with the resin-containing coating adhered to the squeegee 101.

In the example shown in FIG. 3A and FIG. 3B, the coating-temporarily-retaining region 111 is located in the vicinity of one of the end portions of the screen 104 in the traveling direction of the squeegee 101, i.e., the end portion at which the traveling starts. The squeegee 101 is arranged at the side adjacent to the position where the traveling starts, when viewed from the side of the resin-containing coating 103 supplied to the coating-temporarily-retaining region 111 on the screen 104.

Next, the squeegee 101 is slid on the screen 104, with application of a load on the screen 104, so that the squeegee 101 passes the application region 106 of the screen 104. Due to the sliding of the squeegee 101, a part of the resin-containing coating passes through the first pores of the application region 106 so as to be applied on the first information recording portion 602. The remaining part of the resin-containing coating 103, which has not been applied on the first information recording portion 602, is either stored in a region 113 between the application region 106 and the removal region 107, or removed from the surface of the screen 104 by passing through the second pores of the removal region 107. In the example shown in FIG. 4A and FIG. 4B, the remaining resin-containing coating is stored in the region 113. The resin-containing coating 103 stored in the region 113 is removed from the surface of the screen 104 in a manner as mentioned in the following (1) and/or (2), for example.

(1) The resin-containing coating 103 moves gradually into the removal region 107 due to its own liquidity so as to be removed from the surface of the screen 104.

(2) In a process of manufacturing another multilayer information recording medium, a coating layer is formed in the same manner as described above. By the excess resin-containing coating remaining during formation of this coating layer, the resin-containing coating 103 that has been stored in the region 113 is pushed from the region 113 and enters the removal region 107 so as to be removed from the surface of the screen 104.

When the viscosity of the resin-containing coating 103 supplied to the screen 104 is excessively low, the liquidity of the applied resin-containing coating will be higher than a desired level. When the liquidity of the resin-containing coating 103 supplied to the screen 104 is excessively high, the resin-containing coating 103 may be spewed out from the first signal substrate 601, or the resin may be mounded on the edge portions of the first signal substrate 105 after curing. When the viscosity of the resin-containing coating 103 is excessively high, it would be difficult for the resin-containing coating 103 to pass through the first pores of the application region 106. This will lead to difficulty in application of the resin-containing coating 103 onto the first information recording portion 602. When considering the influence or the like on the viscosity of the resin-containing coating 103 caused by the temperature change and/or the humidity change, the viscosity of the resin-containing coating 103 supplied to the screen 104 is preferably in a range of 30 cps to 10000 cps (30 mPa·s to 10000 mPa·s) at an atmosphere of 25° C., more preferably, 1000 cps to 5000 cps (1000 mPa·s to 5000 mPa·s).

In the present application, the viscosity denotes a value measured by using a rotational viscometer. The measurement of viscosity by using a rotational viscometer employs the proportional connection of the rotational torque of the rotor to viscosity. For the rotor, for example, a tubular rotor, a blade or the like is used. The rotational torque denotes a force required to rotate a rotor contained in a sample (resin-containing coating) continuously at a constant rate by a motor or the like joined through a shaft.

The multilayer information recording medium manufactured in the present embodiment includes resin layers 603, 605 and 607 (see FIG. 1) having an average thickness of 5 μm to 25 μm for example, so that information can be reproduced by using a recording/reproducing head including an object lens having a numerical aperture of 0.85 and a laser light source for emitting light having a wavelength of 405 nm.

The range for applying the resin-containing coating 103 can be limited by selecting the area, shape and the like of the application region 106 of the screen 104. In the present embodiment, the outer diameter φ of the first signal substrate 601 is 120 mm for example. The first signal substrate 601 has a center hole 610 (see FIG. 1) having a diameter of φ15 mm for example. The screen 104 used with respect to this first signal substrate 601, for example, has the application region 106 where the resin-containing coating 103 can be applied only to a region that is positioned, for example, outside the inner diameter of the first signal substrate 601 (for example, a region separated from the center by at least 10 mm) and inside the outer diameter of the first signal substrate 601 (for example, a region within 59.5 mm from the center). When the screen 104 is used, the resin-containing coating 105 can be applied on the first signal substrate 601 excepting the outer edge portion 601a (see FIG. 1) and the inner edge portion 601b (see FIG. 1) of the first signal substrate 601, that is, inside a circle with a diameter of 119 mm and outside a circle with a diameter of 20 mm (see FIG. 4A).

In a case where the resin-containing coating 103 is applied also on the outer edge portion 601a (see FIG. 1) and the inner edge portion 601b (see FIG. 1) of the first signal substrate 601, when the resin contained in the resin-containing coating 103 is cured, the resin applied to the respective edge portions will be mounded by a surface tension. As a result, the resin layers 603, 605 and 607 (see FIG. 1) will be considerably thicker at the respective edge portions than at the other portions. Thus, the uniformity in the thickness of the resin layers 603, 605 and 607 will be degraded. The variation in thickness of the resin layers 603, 605 and 607 leads to a variation in a light spot size due to an increase in a spherical aberration at the time of recording information or reproducing information using a laser beam. Furthermore, the above-noted variation in thickness adversely affects a focusing control for maintaining a focus of a light spot on an information surface or a tracking control for allowing the light spot to follow a signal train. As a result, there arises a problem that information cannot be recorded on or reproduced from the multilayer information recording medium excellently. Moreover, since the resin-containing coating is spewed from the first signal substrate 601, there arise problems, for example, the dimensional accuracies for the inner and outer diameters of the multilayer information recording medium are degraded and the appearance will be sacrificed.

However, when the area, shape and the like of the application region 106 of the screen 104 are set to be located within the plane of the first signal substrate 601 facing the screen 104, the variations in thickness of the resin layers 603, 605 and 607 (see FIG. 1) and the variation in the optical path length can be suppressed. As a result, a multilayer information recording medium, which can suppress the variation in the light spot size due to the increase in the spherical aberration and can perform stably both the focusing control and the tracking control, can be provided. In addition, a multilayer information recording medium that has excellent dimensional accuracy and preferable appearance can be provided.

There is no particular limitation for the area, the shape or the like of the removal region 107 in the screen 104 as long as the excess resin-containing coating can be removed satisfactorily. However, as shown in FIG. 3B, it is preferable that the width W2 of the removal region 107 crossing the traveling direction X of the squeegee 101 is larger than the width W1 of the squeegee 101. When the width W1 us greater than the width W1, the resin-containing coating 103 spewed out from the both edge portions 101a, 101b of the squeegee 101 also can be removed efficiently as shown in FIG. 4B. In addition to that, when the area of the removal region 107 is larger, the resin-containing coating can be removed more efficiently.

There is no particular limitation for the position of the removal region 107 in the screen 104, as long as the removal region 107 is disposed closer to the end portion in the traveling direction than the application region 106, along the traveling direction of the squeegee 101, and as long as the removal region 107 is not connected to the application region 106. However, it is preferable that the application region 106 and the removal region 107 are separated from each other so that the excess resin-containing coating 103 is prevented from flowing backwards and entering the application region 106.

It is preferable that a surfactant is contained in the resin-containing coating 103 in order to suppress the mixture of air at the time of application. When the resin-containing coating 103 with the mixed air is used, the uniformity in the resin thickness is degraded, and the recording property or the reproducing property of the multilayer information recording medium will deteriorate.

The surfactant can be an anionic surfactant or a nonionic surfactant, for example. Among them, a nonionic surfactant with which leveling (smoothing of the surface unevenness) of the coating layer 110 can be performed more preferably is preferred.

In the method for manufacturing the multilayer information recording medium of the present embodiment, the following methods of (1) to (3) are employed preferably for the method of removing air bubbles mixed in the resin-containing coating 103.

(1) After application of the resin-containing coating 103, a signal is transferred to the coating layer 110, and subsequently, the resin contained in the coating layer 110 is cured. After forming the coating layer by applying the resin-containing coating, the coating layer is allowed to stand for a predetermined period and then subjected to a signal transfer. The signal transfer is carried out, for example, by using a signal transfer substrate 802 (see FIG. 5A) having an uneven surface as an information surface. The standing can be performed under an atmospheric pressure, but preferably performed in the decompressed atmosphere (for example, 1 Pa to 100 Pa). Though the preferable standing time varies depending on factors such as the viscosity of the resin-containing coating 103 and the environment for standing, more time will be required as the viscosity of the resin-containing coating 103 is higher. Typically, the time is from about 1 to about 5 minutes. By allowing the standing for a predetermined period, the air bubbles contained in the resin-containing coating 103 are removed, and the coating layer 110 is leveled preferably. There is no necessity to set the degree of "smoothness" so strictly as long as the attaching of the first signal substrate 601 and the signal transfer substrate 802 (see FIG. 5A) can be carried out satisfactorily.

(2) A defoamer is mixed in the resin-containing coating. The defoamer is not particularly limited but can be, for example, a silicone-based defoamer, a non-silicone-based defoamer or the like. In particular, the non-silicone-based defoamer is preferable in view of ensuring of the light transmittance of the resin layers 603, 605 and 607 (see FIG. 1). The non-silicone-based defoamer is not particularly limited but can be, for example, 2-ethylhexanol, a polypropylene derivative, an oleic acid or the like.

(3) A resin-containing coating from which bubbles have been removed is used. The defoaming is carried out in a container such as a metallic drum container decompressed by a rotary pump or the like.

Although the effectiveness of removing air bubbles provided by the employment of the above (1) to (3) varies depending on the kind, viscosity, etc. of the resin-containing coating, the combination of these methods makes it possible to reduce the bubbles in the resin-containing coating considerably.

Accordingly, the coating layer 110 having high accuracy and excellent thickness uniformity can be formed (see FIG. 4A).

Next, the first signal substrate 601 with the coating layer 110 formed on one principal surface is taken out from the table 109, and another first signal substrate 601 on which a first information recording portion 602 is formed is fixed onto the table 109. Replacement of first signal substrates 601 with the first information recording portions 602 formed thereon and sliding in the traveling direction X of the squeegee 101 are repeated to apply the resin-containing coating 103 onto a plurality of first information recording portions, thereby the coating layers can be formed continuously.

More specifically, for example, the treatments described with reference to FIG. 3A to FIG. 4B are performed with respect to the first signal substrates 601 on which different first information recording portions 602 have been formed. The resin-containing coating 103 can be supplied to the screen 104 every time one coating layer 110 is formed. Alternatively, the supply can be carried out every time a plurality of the coating layers 110 are formed.

After forming the respective coating layers 110, the squeegee 110 shown in FIG. 4A is slid in a direction opposite to the traveling direction X. By performing simultaneously the sliding of the squeegee 110 in the opposite direction and the replacement of the first signal substrate 602 with the first information recording portion 602 formed thereon, the tact time required for forming a separate resin layer can be shortened.

Next, the treatment after application of the resin-containing coating 103 in the second process will be described.

Figure 5A:
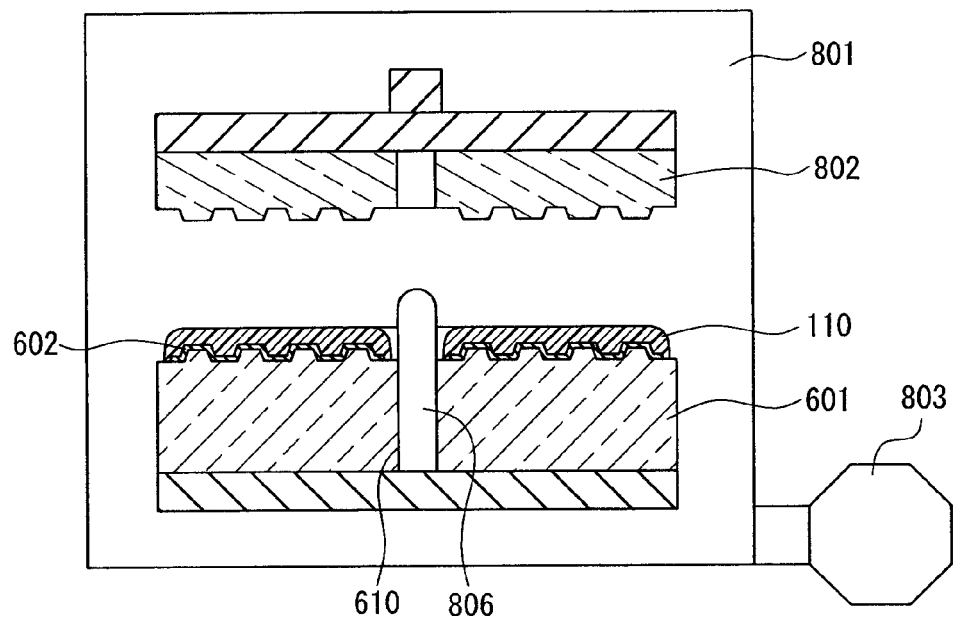
FIG. 5A is a sectional view of a process for describing an example of a method for manufacturing the multilayer information recording medium shown in FIG. 1.

As shown in FIG. 5A, the first signal substrate 601 having one principal surface provided with the coating layer 110 is placed in a decompression chamber 801. The first signal substrate 601 is fixed at a predetermined position by passing a center boss 806 through a center hole 610 formed at the center of the first signal substrate 601. A signal transfer substrate 802 also is placed in the decompression chamber 801. It is preferable that the signal transfer substrate 802 contains, for example, polyolefin, which has an excellent peelability from the ultraviolet curable resin. Since polyolefin has an excellent formability, it also is preferred as a material for the signal transfer substrate 802 in that the uneven information surface including pits and guide grooves can be formed easily by a resin molding method such as an injection compression molding.

Further, since polyolefin has an ultraviolet-transmitting property, the coating layer 110 is irradiated with ultraviolet light through the signal transfer substrate 802, thereby curing the ultraviolet curable resin contained in the coating layer 110 efficiently. Such polyolefin can be, for example, cycloolefin made from cydopentadiene.

When the average thickness of the first signal substrate 601 is 1.1 mm for example, the average thickness of the signal transfer substrate 802 preferably is set to 0.6 mm for example. The use of the signal transfer substrate 802 thinner than the first signal substrate 601 makes it easy to peel off the signal transfer substrate 802 after the resin curing, owing to the difference in rigidity caused by the difference in thickness.

Figure 5B:
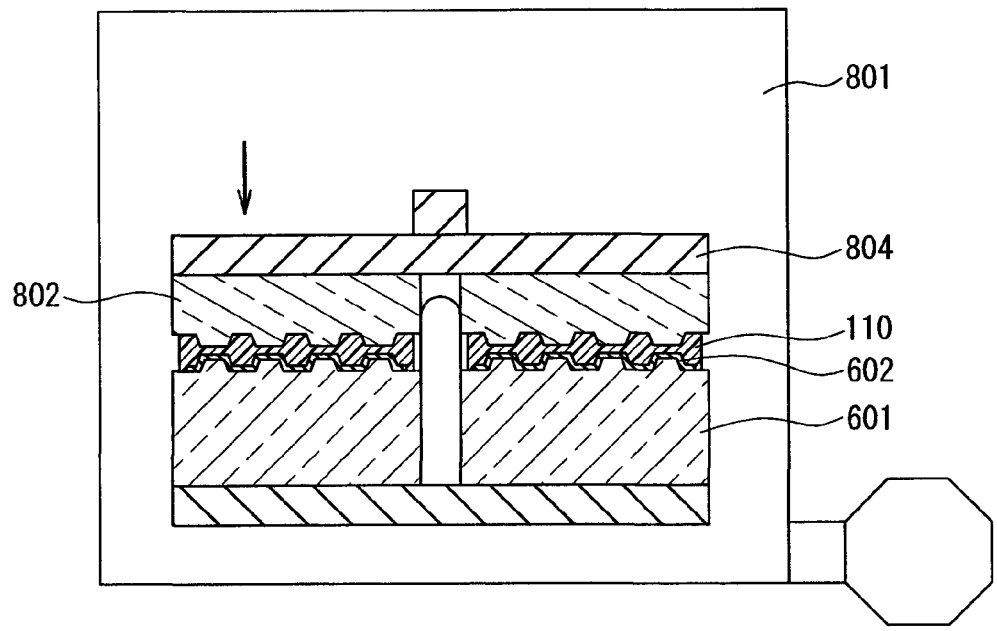
FIG. 5B is a sectional view of a process for describing an example of a method for manufacturing the multilayer information recording medium shown in FIG. 1.

The decompression chamber 801 can be exhausted by a pressure-reducing pump 803 such as a rotary pump or a mechanical booster pump and be decompressed to a predetermined pressure within a short time. In the present embodiment, when the interior of the decompression chamber 801 reaches a degree of vacuum equal to or lower than 100 Pa, for example, the signal transfer substrate 802 and the first signal substrate 601 are attached to each other via the coating layer 110 and the first information recording layer 602 as shown in FIG. 5B. At this time, the signal transfer substrate 802 is pressed with a pressing plate 804, thereby transferring the uneven surface of the signal transfer substrate 802 serving as the information surface to the coating layer 110. Since the interior of the decompression chamber 801 is decompressed, the coating layer 110 and the signal transfer substrate 802 can be attached to each other without allowing air bubbles to enter between the coating layer 110 and the signal transfer substrate 802. Moreover, it also is possible to remove the air bubbles that have entered the resin-containing coating at the time of applying the resin-containing coating onto the first information recording portion 602.

Figure 5C:
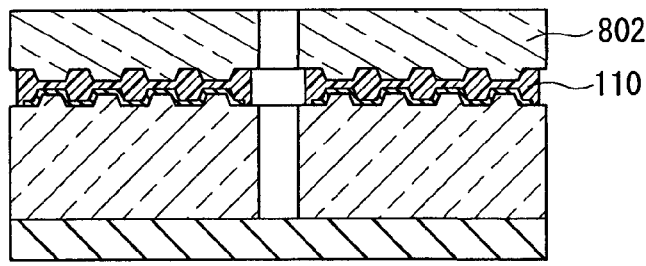
FIG. 5C is a sectional view of a process for describing an example of a method for manufacturing the multilayer information recording medium shown in FIG. 1.

Next, the first signal substrate 601 and the signal transfer substrate 802 that are attached to each other are taken out from the decompression chamber 801. Subsequently, as shown in FIG. 5C, the coating layer 110 is irradiated with ultraviolet light through the signal transfer substrate 802 using an ultraviolet irradiating device 805 arranged above the signal transfer substrate 802, thereby curing the ultraviolet curable resin contained in the resin-containing coating. In this manner, the coating layer 110 is formed into a resin layer.

Figure 5D:
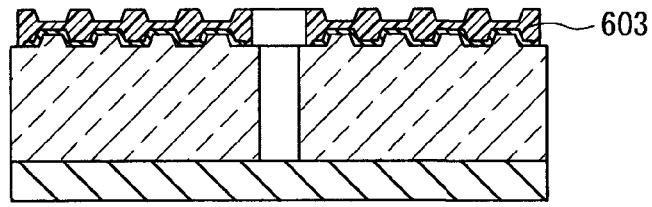
FIG. 5D is a sectional view of a process for describing an example of a method for manufacturing the multilayer information recording medium shown in FIG. 1.

Thereafter, the signal transfer substrate 802 is peeled off from the resin layer 603 (see FIG. 5D). At this time, it is preferable that compressed air is blown into the space between the signal transfer substrate 802 and the resin layer 603. In this manner, the resin layer 603 having an information surface is formed.

Similarly to the case of attaching the signal transfer substrate 802 and the first signal substrate 601, ultraviolet irradiation and/or peeling of the signal transfer substrate 802 can be carried out in the decompressed atmosphere.

Next, in the first process, the second information recording portion 604 is formed by sputtering or the like similarly to the first information recording portion 602. Further, the third and fourth information recording portions 606 and 608 are formed similarly. In the second process, the resin layers 605 and 607 are formed similarly. That is, after forming the first information recording portion 602 and the resin layer 603, the first process and the second process are carried out in this order respectively a required number of times (see FIG. 1).

Finally, the transparent layer 609 is formed on the fourth information recording portion 608. The transparent layer 609 is formed using an ultraviolet curable resin containing as a principal component an acrylic resin that is substantially transparent to (transmits) recording/reproducing light. Similarly to the resin layers 603, 605 and 607 for example, the transparent layer 609 also is formed by applying a coating for forming the transparent layer 609 to the fourth information recording portion 608 through the screen (see FIG. 1).

The average thickness of the transparent layer 609 directly above the fourth information recording portion 608 is determined according to the thickness of the resin layers 603, 605 and 607 between the transparent layer 609 and the first information recording portion 602 so that the distance from the surface of the transparent layer 609 to the first information recording portion 602 is about 100 µm. This 100 µm is a correctable limit of spherical aberration by the recording/reproducing head used in the present embodiment.

For example, in the case where the average thickness of each of the resin layers 603, 605 and 607 is 9.5 µm, 13.5 µm and 17.5 µm, the average thickness of the transparent layer 609 is set to 59.5 µm (100 µm−9.5 µm−13.5 µm−17.5 µm). Also, in the case where the average thickness of the resin layers 603, 605 and 607 is 10 µm, the average thickness of the transparent layer 609 is set to 70 µm (100 µm−10 µm×3 layers). Incidentally, the thickness of each of the first to fourth information recording portions is incomparably smaller than those of the resin layers 603, 605, 607 or the transparent layer 609, and thus is considered negligible.

In the method for manufacturing a multilayer information recording medium according to the present embodiment, all of the resin layers 603, 605, 607, and the first to fourth information recording portions 602, 604, 606, 608 are formed on the first signal substrate 601 except for the outer edge portion 601a and the inner edge portion 601b of the first signal substrate 601 (see FIG. 1). Thus, the transparent layer 609 can be formed to join with the outer edge portion 601a and the inner edge portion 601b of the first signal substrate 601. Consequently, the first to fourth information recording portions 602, 604, 606 and 608, and the resin layers 603, 605 and 607 can be surrounded by the transparent layer 609 and the first signal substrate 601. Polycarbonate has a high adhesiveness to an ultraviolet curable resin that has not been cured and a cured ultraviolet curable resin. Therefore, the use of polycarbonate as the material for the first signal substrate 601 and an ultraviolet curable resin as that for the transparent layer 609 suppresses the peeling of the resin layer and the information recording layer from each other due to moisture or the like.

The above description relates to a case where a signal is transferred onto a coating layer by forming a coating layer above the first signal substrate and subsequently stacking the signal transfer substrate. However, for example, when it is difficult to form a resin layer of a desired thickness because the viscosity of the resin-containing coating is relatively low, the coating layer can be formed in the manner below.

A first resin-containing coating is applied onto the signal transfer substrate 802 through pores of a first screen. On the other hand, a second resin-containing coating is applied above the first signal substrate through a second screen. The first screen and the second screen used here can be configured similarly to the screen 104 illustrated using FIG. 3A to FIG. 4B. The compositions of the first resin-containing coating and the second resin-containing coating may be similar to those of the example mentioned using FIG. 3A to FIG. 4B.

Then, the first signal substrate 601 and the signal transfer substrate 802 are attached to each other via the first resin-containing coating and the second resin-containing coating at a pressure lower than atmospheric pressure. After bonding the first resin-containing coating and the second resin-containing coating, these resin-containing coatings are irradiated with ultraviolet light through the signal transfer substrate so as to cure the resin. In this manner, even when the viscosity of the resin-containing coating is relatively low, a resin layer of a desired thickness can be formed.

The following description is about a study of a case where a plurality of coating layers are formed without newly supplying the resin-containing coating in the midst of the process.

Under the below-mentioned condition, twenty coating layers 110 (see FIG. 4A) were formed without newly supplying the resin-containing coating in the midst of the process. And the thickness was measured for each of the respective resin layers 603 (see FIG. 1) obtained by curing the resin contained in each of the thus formed coating layers 110. Table 1 indicates the average thickness, the minimum thickness, the maximum thickness and the thickness variation for the respective resin layers 603. The target value for the average thickness of the respective resin layers was set to 25 μm.

Atmospheric temperature before forming a coating layer: 25° C.

Shape of first signal substrate 601: outer diameter is 120 mm, inner diameter is 15 mm Shape of first information recording portion 602: outer diameter is 117 mm, inner diameter is 46 mm Material for screen: a mesh made of polyarylate on which an emulsion (diazo photosensitive emulsion) is coated excepting the application region 106 and the removal region 107 (see FIG. 3B for example)

Number of meshes in the application region 106: 160 (wire width: 45 μm)

Number of meshes in the removal region: 100 (wire width: 70 μm)

Supply amount of resin-containing coating: 5 ml

Viscosity of resin-containing coating 103 before application: 2000 mPa·s (atmospheric temperature: 25° C.)

Shortest distance between screen 104 and first information recording portion 602 before application: 3.5 mm (Points for Measuring Thickness of Resin Layer)

The thickness of each resin layer was measured on the circumference with radii of 22 mm, 28 mm, 33 mm, 38 mm, 43 mm, 48 mm, 53 mm, 58 mm, 58.3 mm and 58.6 mm, about the center of the first signal substrate 601, with spacing of 6 degrees respectively. That is, the thickness of the respective resin layers was measured for 600 points in order to avoid duplication of the measurement points. The average thickness in Table 1 denotes the average values of thickness at the 600 points.

(Method of Measuring Thickness of Resin Layer)

The thickness of the resin layer was measured by a method (PV method) using an optical interference effect. This method utilizes the following nature of light. Namely, light reflected on the surface of the resin layer and light reflected on the back face cause interference with each other, and the intensity is increased when the phases of these reflected light beams agree, and the intensity is decreased when the phases shift. An interference pattern where the reflected light intensity changes with the change in the wavelength was observed, and the thickness d of the resin layer is obtained in view of the relations that a peak wavelength $\lambda 1$ and a valley wavelength $\lambda 2$ in this pattern are integral multiples of the optical path difference 2nd (n=refractive index of resin layer; d=thickness of resin layer).

For measuring the thickness of the resin layer, a laser beam having a wavelength longer than that of a laser beam used for recording/reproducing of information on/from a multilayer information recording medium was used.

If a light source that emits light having a wavelength substantially equal to the laser beam for reproducing information recorded on a multilayer information recording medium is used for the apparatus for measuring the thickness of the resin layer, optical diffraction would occur due to the information recorded on the information recording portion, and the optical diffraction would affect adversely the measurement of the thickness of the resin layer. Since a blue laser beam having a wavelength of about 400 nm is used for the laser beam for recording/reproducing in this example, the thickness of the resin layer was measured by using a red laser beam having a wavelength of about 650 nm.

The thickness variation in Table 1 denotes a Peak to Peak value (PP value) when a resin layer is formed by setting the target value for thickness of the resin layer as "average thickness: 25 μm". For example, when the PP value is 1.5 μm, it is indicated as 1.5 μm in Table 1.

TABLE 1

|  | Average thickness (μm) | Minimum value (μm) | Maximum value (μm) | Thickness variation (μm) |
| --- | --- | --- | --- | --- |
| 1st | 24.8 | 24.0 | 25.5 | 1.5 |
| 2nd | 25.1 | 24.1 | 26.0 | 1.9 |
| 3rd | 25.0 | 24.2 | 25.8 | 1.6 |
| 4th | 25.2 | 24.0 | 25.8 | 1.8 |
| 5th | 25.2 | 24.3 | 25.8 | 1.5 |
| 6th | 25.8 | 25.0 | 26.8 | 1.8 |
| 7th | 25.9 | 24.9 | 26.6 | 1.7 |
| 8th | 26.0 | 24.9 | 26.9 | 2.0 |
| 9th | 26.2 | 25.1 | 27.0 | 1.9 |
| 10th | 26.1 | 25.2 | 27.2 | 2.0 |
| 11th | 27.0 | 26.0 | 28.0 | 2.0 |
| 12th | 27.2 | 25.7 | 28.6 | 2.9 |
| 13th | 28.0 | 25.0 | 28.8 | 3.8 |
| 14th | 28.8 | 26.5 | 30.0 | 3.5 |
| 15th | 29.0 | 26.4 | 30.0 | 3.6 |
| 16th | 29.3 | 27.2 | 31.0 | 3.8 |
| 17th | 29.7 | 28.0 | 31.3 | 3.3 |
| 18th | 30.0 | 29.1 | 32.2 | 3.1 |
| 19th | 30.8 | 28.9 | 32.5 | 3.6 |
| 20th | 31.2 | 29.3 | 32.5 | 3.2 |

When the multilayer information recording medium records and reproduces information by using light having a wavelength of 405 nm, and when the target value of the average thickness of the resin layer is 25 μm, the PP value permissible for the resin layer is 2.5 μm.

As indicated in Table 1, the thickness variation of the first to the 11th coating layers is not more than 2.5 μm. This demonstrates that eleven resin layers of a practically permissible level regarding the thickness variation can be formed even when the resin-containing coating is not newly supplied before finishing formation of the 11th coating layer.

As indicated in Table 1, the thickness variation is increased in a resin layer formed later. This occurred since the viscosity and the temperature of the resin-containing coating change and the resin-containing coating is modified. It is considered that the main factors for modifying the resin-containing coating are the air mixed during the movement of the resin-containing coating and frictional heat generated by the moving.

The example shown in Table 1 relates to results for a case of using a resin-containing coating having a viscosity of 2000 mPa·s at an atmospheric temperature of 25° C. Similar effects can be obtained even by using resin-containing coatings having viscosities of 1000 to 4000 mPa·s at an atmospheric temperature of 25° C.

The following description refers to a study about a case where 5000 coating layers are formed continuously by adding 30 ml of the resin-containing coating every time ten coating layers are formed.

Thickness measurement was performed for some of the 5000 resin layers. Table 2 indicates the average thickness, the minimum thickness, the maximum thickness and the thickness variation of the resin layers. The amount of the initially-supplied resin-containing coating was set to 30 ml as well. During formation of the 5000 coating layers, air at 22° C. was blown continuously at 10 m³/min. into the atmosphere by using a water-cooling apparatus so that the temperature of the screen and the temperature of the resin-containing coating on the screen were kept substantially constant. The thickness of the resin layers was measured in the same manner as the example indicated in Table 1. The remaining conditions are the same as those indicated in Table 1.

TABLE 2

| | Average thickness (μm) | Minimum value (μm) | Maximum value (μm) | Thickness variation (μm) |
|---|---|---|---|---|
| 1$^{st}$ | 24.8 | 24.0 | 25.5 | 1.5 |
| 2$^{nd}$ | 25.1 | 24.1 | 25.4 | 1.3 |
| 3$^{rd}$ | 25.0 | 24.2 | 25.8 | 1.6 |
| 4$^{th}$ | 25.2 | 24.3 | 25.8 | 1.5 |
| 10$^{th}$ | 25.4 | 24.9 | 26.1 | 1.2 |
| 100$^{th}$ | 25.1 | 24.7 | 26.0 | 1.3 |
| 200$^{th}$ | 25.3 | 24.4 | 26.0 | 1.6 |
| 500$^{th}$ | 25.5 | 24.9 | 26.1 | 1.2 |
| 1000$^{th}$ | 24.7 | 23.8 | 25.2 | 1.4 |
| 2000$^{th}$ | 24.8 | 24.0 | 25.4 | 1.4 |
| 5000$^{th}$ | 25.4 | 25.0 | 26.4 | 1.4 |

As indicated in Table 2, the thickness variation for all of the measured resin layers was substantially constant, namely 2.5 μm or less. Similarly, the average thickness of the resin layers was substantially constant.

In the example as indicated in Table 2, 30 ml of the resin-containing coating was added every time ten coating layers were formed. For example, when the first signal substrate 601 has an outer diameter of 120 mm and an inner diameter of 15 mm, and the first information recording portion 602 has an outer diameter of 117 mm and an inner diameter of 46 mm, the amount of the resin-containing coating required for forming the resin layer 603 is about 0.25 ml. Therefore, the resin-containing coating used for forming ten resin layers is no more than 2.5 ml. Therefore, according to calculation, every time ten coating layers are formed, 27.5 ml (=30 ml−2.5 ml) of the resin-containing coating 103 is stacked on the region 113 (see FIG. 4B) between the removal region 107 and the application region 106 on the screen 104. In this manner, the resin-containing coating of an amount considerably exceeding the amount of the resin-containing coating required for forming the resin layer is supplied in order to form a coating layer with less thickness variation in a smooth and reliable manner.

As shown in FIG. 4B, the resin-containing coating stored on the region 113 is pushed from the region 113 by the added excess resin-containing coating, and enters the removal region 107. The resin-containing coating pushed into the removal region 107 passes through the second pores (for example, a mesh) of the removal region 107 due to its own weight and is removed gradually from the surface of the screen 104.

Below the removal region 107, a container 108 for holding the resin-containing coating removed from the surface of the screen 104 is provided. Therefore, the resin-containing coating dropping from the surface of the screen 104 is stacked successively in this container 108. According to calculation, 27.5 ml of excess resin-containing coating is stacked on the screen 104 every time ten coating layers are formed. However, since excess resin-containing coating is removed from the removal region 107 gradually, the resin-containing coating will not be spewed out from the surface of the screen 104.

There is no particular limitation on the shape, the opening area and the like of the container 108 as long as the resin-containing coating removed from the surface of the screen 104 can be held.

It is desirable that the resin-containing coating held in the container 108 is recycled and reused. Since the excess resin-containing coating has been exposed to the air for a long time and/or rubbed on the screen 104, there is a high possibility that air bubbles and foreign objects have been mixed. If a resin-containing coating with air bubbles and foreign objects mixed therein is used for forming resin layers, preferable recording or reproduction cannot be performed. Therefore, such air bubbles and foreign objects must be eliminated before reuse.

The recycling is carried out for example in the following manners (1) to (4).

(1) The resin-containing coating is filtered to remove foreign objects.

(2) The resin-containing coating is placed for a while in a decompression chamber in order to remove air bubbles in the resin-containing coating.

(3) The air bubbles are removed by use of centrifugal force.

(4) The air bubbles are isolated and floated from the resin-containing coating or broken by using ultrasonic waves.

It is preferable that two or more of these methods are employed in combination. For example, it is preferable that the resin-containing coating to be recycled is passed through a cartridge filter having a mesh that can reject impurities having a diameter of 10 μm or more so as to remove the impurities from the resin-containing coating, and subsequently, air bubbles are removed from the resin-containing coating by using a centrifugal defoaming apparatus. By supplying the thus recycled resin-containing coating onto the screen 104 again, the effective usage rate of the resin-containing coating can be improved.

As mentioned above, the present embodiment can be applied suitably to mass production since the thickness and the thickness variation of the resin layers can be kept substantially constant even if the resin-containing coating is newly supplied every time a plurality of (for example, ten) coating layers are formed. Moreover, since a removal region 107 for removing excess resin-containing coating is provided on the screen 104, the excess resin-containing coating can be removed form the surface of the screen 104. Therefore, the frequency of maintenance of the screen can be reduced. Furthermore, since the excess resin-containing coating removed from the surface of the screen 104 can be supplied again onto the screen 104 after recycling, the effective usage rate of the resin-containing coating can be improved.

Embodiment 2

In Embodiment 2, another example of a method for manufacturing a multilayer information recording medium as shown in FIG. 1 will be described with reference to FIG. 6A to FIG. 8.

Figure 6A:
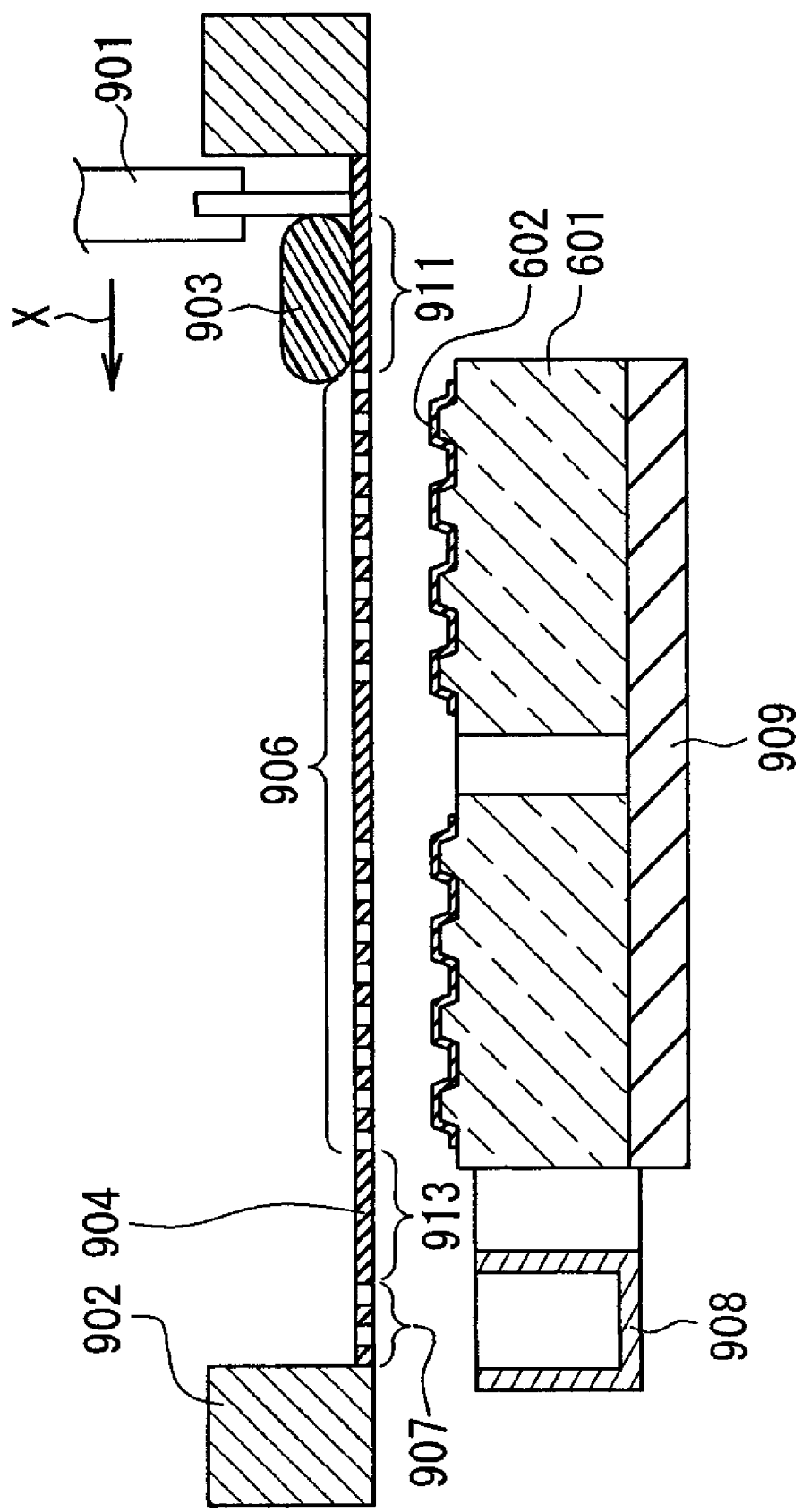
FIG. 6A is a sectional view of a process for describing another example of a method for manufacturing the multilayer information recording medium shown in FIG. 1, showing a state just before application of a resin-containing coating.
Figure 6B:
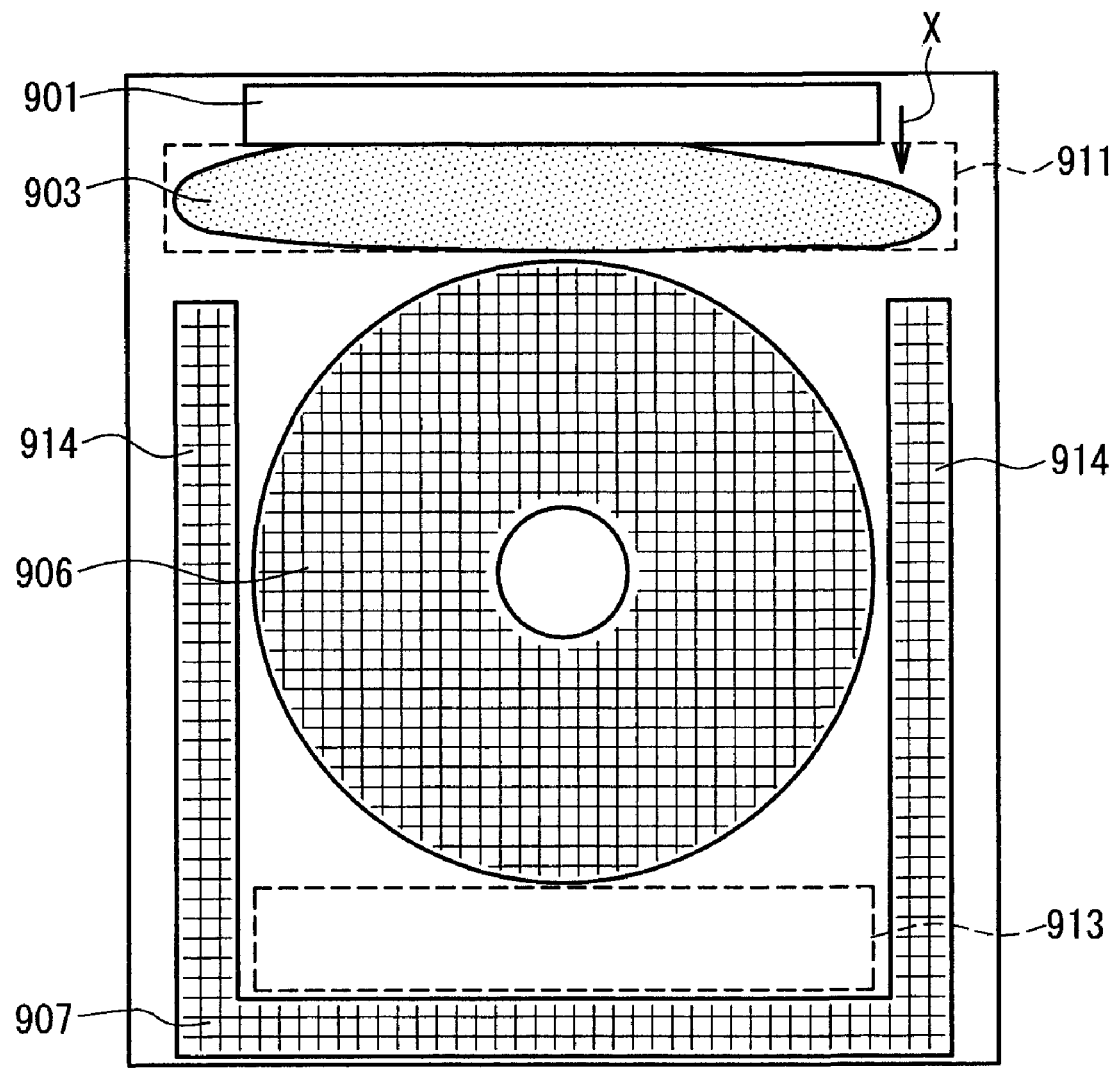
FIG. 6B is a plan view showing the screen and the squeegee shown in FIG. 6A.
Figure 7A:
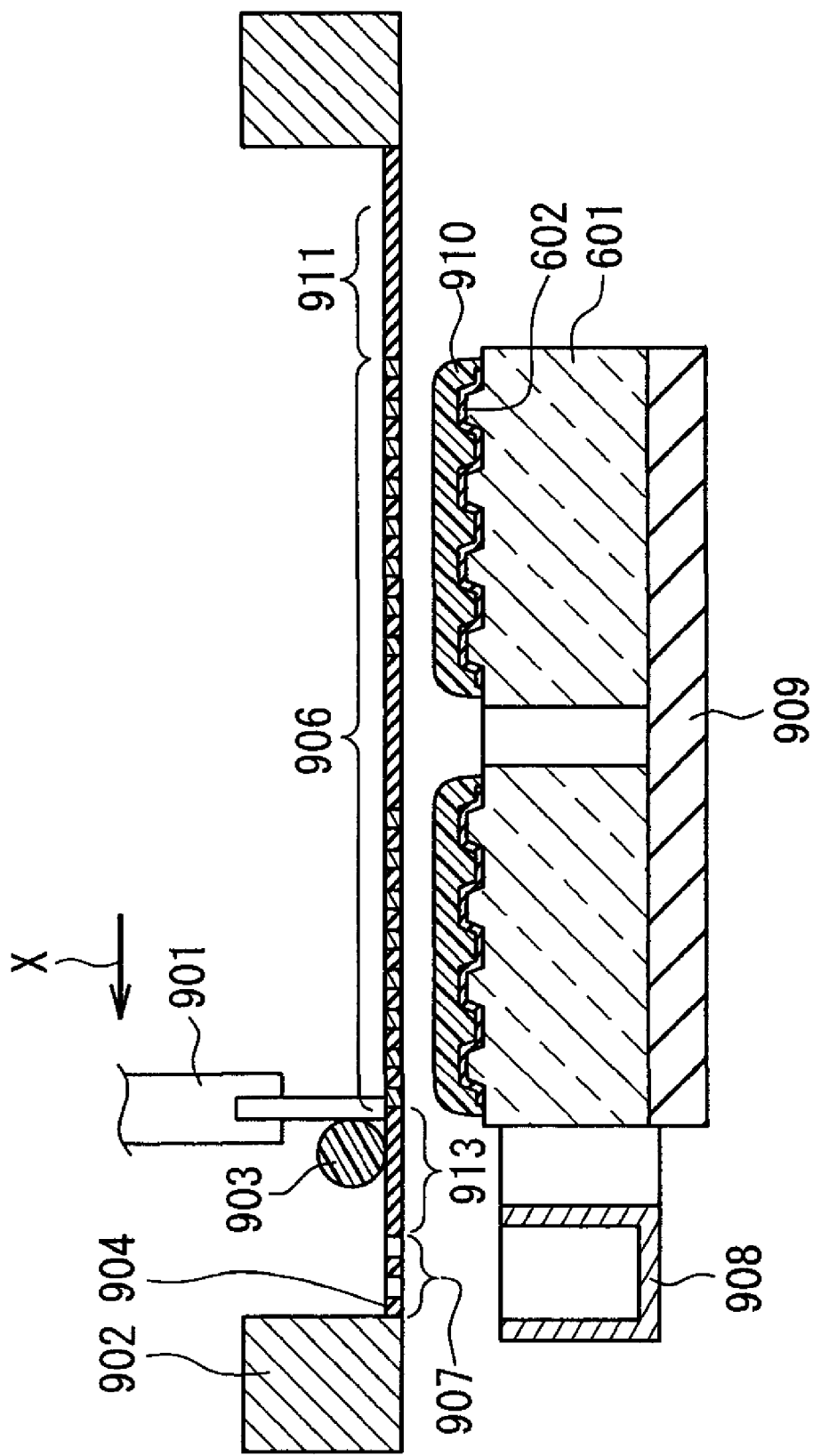
FIG. 7A is a sectional view of a process for describing another example of a method for manufacturing the multilayer information recording medium shown in FIG. 1, showing a state just after application of a resin-containing coating.
Figure 7B:
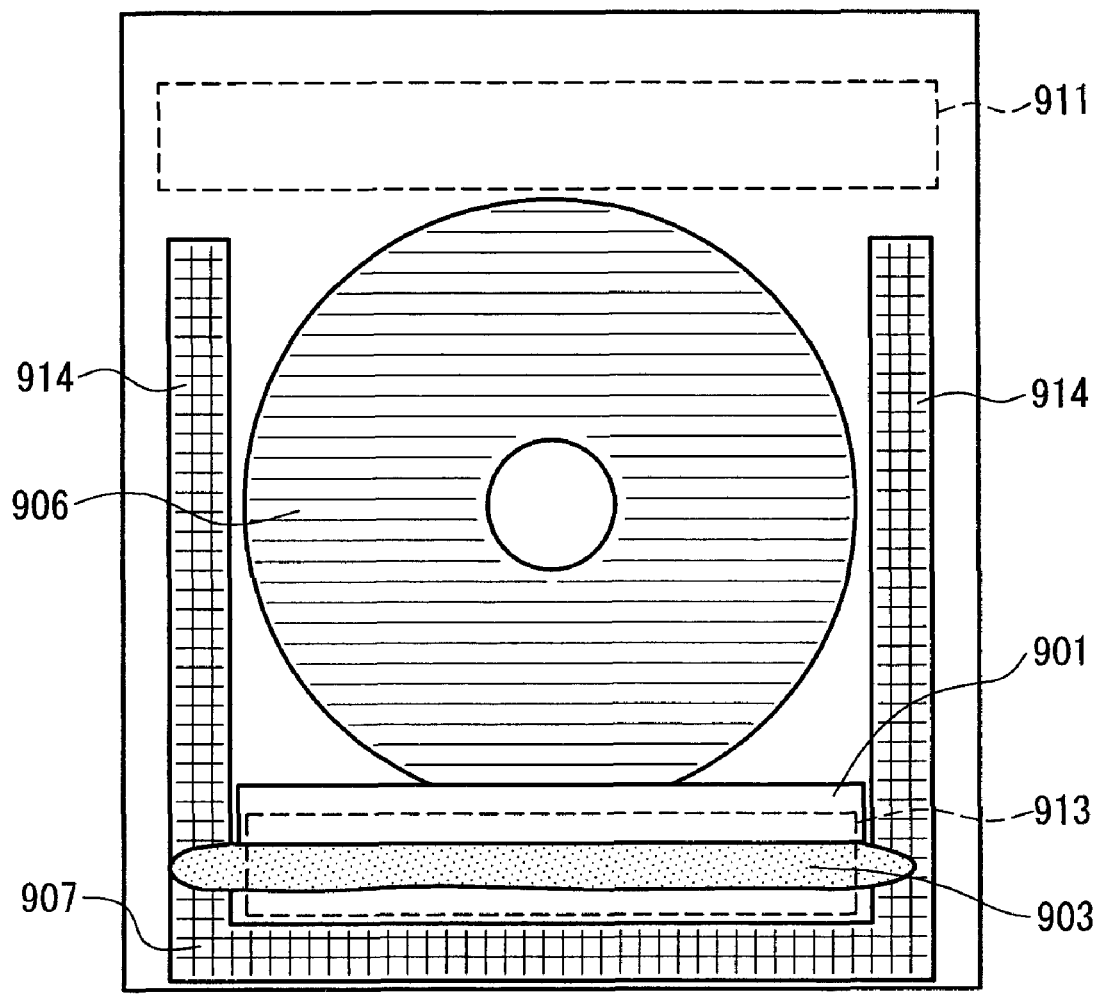
FIG. 7B is a plan view showing the screen and the squeegee shown in FIG. 7A.

FIG. 6A and FIG. 7A are sectional views of a process for describing an example of a method for manufacturing the multilayer information recording medium. FIG. 6A shows a state just before application of a resin-containing coating, and FIG. 7A shows a state just after application of a resin-containing coating. FIG. 6B is a plan view showing a screen and a squeegee just before application of a resin-containing coating, and FIG. 7B is a plan view showing a screen and a squeegee just after application of a resin-containing coating. A resin-containing coating 903 used here can be the same as the resin-containing coating 103 used in Embodiment 1.

In these figures, numeral 901 denotes a squeegee, 902 denotes a screen frame, 903 denotes a resin-containing coating containing an ultraviolet curable resin, 904 denotes a screen, 601 denotes a first signal substrate, 602 denotes a first information recording portion, 906 denotes an application region, 907 denotes a removal region for removing excess resin-containing coating 903, numeral 911 denotes a coating-temporarily-retaining region, 908 denotes a container for holding the excessive resin-containing coating 903 removed from the screen 904, numeral 909 denotes a table, and 910 denotes a coating layer formed on the first signal substrate 601 by applying the resin-containing coating 903.

The present embodiment is substantially same as Embodiment 1 except that the second process includes: (1) using the screen 904 having a pair of removal auxiliary regions 914 disposed to sandwich the application region 106 and to be separated from the application region 106; and (2) modifying the shape of the container 908 for holding the excess resin-containing coating removed from the screen 904, in accordance with the arrangement of the pair of removal auxiliary regions 914. Hence, for example, the first signal substrate 601 is retained and the squeegee 901 is slid in the same manner as Embodiment 1.

Figure 8:
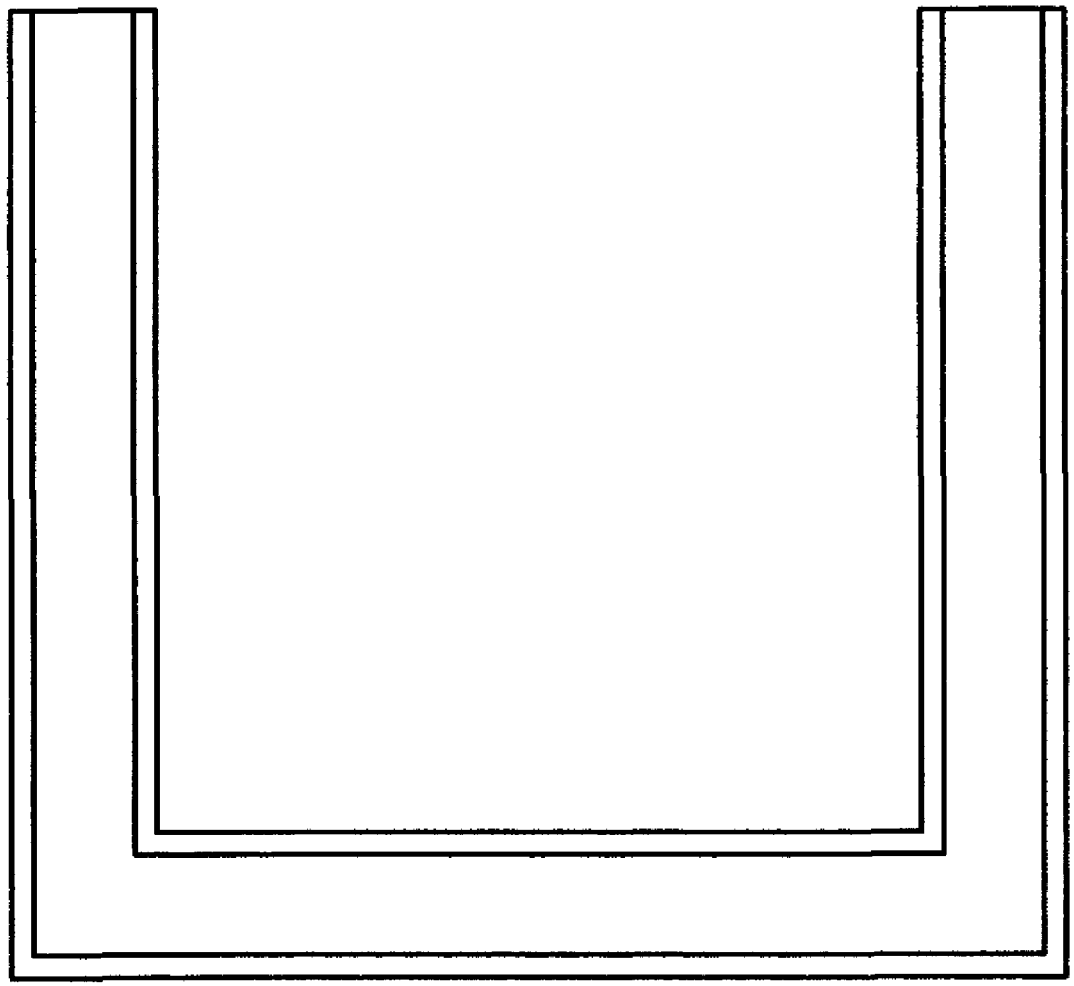
FIG. 8 is a plan view showing an example of a container for holding a resin-containing coating removed from a screen.
Figure 8:

In the present embodiment, since the screen 904 has the removal auxiliary regions 914, the excess resin-containing coating 903 can be removed efficiently from the surface of the screen 904. As shown in FIG. 8, the container 908 in the present embodiment has a planar U-shape for example.

Incidentally, similarly to the case of the removal region 907, the removal auxiliary regions 914 having larger areas can remove excess resin-containing coating more efficiently. However, the area, the shape and the like are not limited particularly as long as the object of the present invention can be achieved. Similarly, there is no particular limitation on the shape, the opening area and the like of the container 908.

In the example shown in FIG. 6B and FIG. 7B, the removal auxiliary regions 914 are connected to the removal region 907 so that the removal auxiliary regions 914 and the removal region 907 constitute one continuous region. This is preferable from a viewpoint that the excess resin-containing coating can be removed efficiently. However, the removal auxiliary regions 914 are not necessarily connected to the removal region 907.

When the third pores constituting the removal auxiliary regions 914 are meshes, the number of meshes in the removal auxiliary regions 914 are preferably in a range of 100 to 600, and the width of the wires is in a range of 20 μm to 100 μm preferably.

In the present embodiment, when the multilayer information recording media are produced in volume, the resin-containing coating 903 is supplied to the coating-temporarily-retaining region 911, i.e., between the squeegee 901 and the application region 906 every time one coating layer is formed, in order to minimize variations in the thickness between the resin layers 603, 605 and 607 (see FIG. 1) of each multilayer information recording medium.

The resin-containing coating 903 is supplied by a coating-supplying part (not shown) such as a dispenser. For example, 10 ml of the resin-containing coating 903 is supplied newly every time one coating layer is formed, in a case where the first signal substrate 601 has an outer diameter of 120 mm and an inner diameter of 15 mm, and the first information recording portion 602 has an outer diameter of 117 mm and an inner diameter of 46 mm. The amount of the initial supply was set to 10 ml as well.

Similarly to Embodiment 1, the target value of the average thickness of the resin layer in the present embodiment was set to 25 μm. The amount of the resin-containing coating 903 required for forming one resin layer 603 is 0.25 ml. Therefore, every time one coating layer is formed, 9.75 ml of the excess resin-containing coating remains on the screen 904. The total amount of the excess resin-containing coating is larger than the case in Embodiment 1. As a result, even though the screen 904 has the removal auxiliary regions 914 as well as the removal region 907, when plural coating layers are formed continuously, the excess resin-containing coating may enter the application region 906 so as to hinder formation of the coating layers.

In such a case, it is preferable that the stroke length of the squeegee 901 (sliding distance in the traveling direction X) is changed periodically. For example, the stroke length for forming the $21^{st}$ coating layer is increased in comparison with the stroke length for forming the $1^{st}$ to the $20^{th}$ coating layers so as to squeeze the excess resin-containing coating stored in the region 913 between the application region 906 and the removal region 907, into the removal region 907. During formation of each coating layer, the squeegee 901 may be slid up to the removal region 907. Alternatively, as described above, by changing the stroke length of the squeegee 901 periodically (for example, every time two or more coating layers are formed), the excess resin-containing coating also can be removed efficiently, and thus the resin layers can be formed efficiently.

In addition to that, in the present embodiment, the resin-containing coating held in the container 908 was recycled in the following manner.

First, the resin-containing coating was passed through a cartridge filter having a mesh that can reject impurities not less than 5 μm in diameter. Next, the resin-containing coating was placed again in the container 908, and the container 908 is decompressed to 90 kPa or less through exhaustion by use of a rotary pump. This state was maintained for one hour for defoaming.

The tact time can be shortened further by performing simultaneously fixing of the first signal substrate 601 to the table 909, supplying of the resin-containing coating 903, correction of the position of the squeegee 901, and the like.

The resin layers 605 and 607 are formed in the same manner as the resin layer 603. The first to fourth information recording portions 602, 604, 606, 608 and the transparent layer 609 are formed in the same manner as Embodiment 1 so as to obtain the multilayer information recording medium as shown in FIG. 1. Namely, after forming the first information recording portion 602 and the resin layer 603, further the first process and the second process are carried out in this order respectively the required number of times. Finally, the transparent layer 609 is formed on the fourth information recording portion 608 (see FIG. 1).

The following description is about a study of a case for forming 5000 resin layers continuously by adding 10 ml of the resin-containing coating every time one coating layer is formed.

Thickness measurement was performed for some of the 5000 resin layers. Table 3 indicates the average thickness, the minimum thickness, the maximum thickness and the thickness variation of the resin layers. The amount of the initial supply of the resin-containing coating was set to 10 ml as well. The thickness of the resin layer was measured in the same manner as the example in Table 1. The other conditions were the same as the example in Table 2.

TABLE 3

| | Average thickness (μm) | Minimum value (μm) | Maximum value (μm) | Thickness variation (μm) |
|---|---|---|---|---|
| $1^{st}$ | 25.2 | 24.4 | 25.7 | 1.3 |
| $2^{nd}$ | 25.1 | 24.1 | 25.4 | 1.3 |
| $3^{rd}$ | 25.2 | 24.3 | 25.7 | 1.4 |
| $4^{th}$ | 25.2 | 24.3 | 25.8 | 1.5 |
| $10^{th}$ | 25.2 | 24.4 | 26.0 | 1.6 |
| $100^{th}$ | 25.1 | 24.7 | 25.8 | 1.1 |
| $200^{th}$ | 25.3 | 24.4 | 26.0 | 1.6 |
| $500^{th}$ | 25.0 | 24.0 | 25.5 | 1.5 |
| $1000^{th}$ | 24.9 | 24.0 | 25.5 | 1.5 |
| $2000^{th}$ | 25.1 | 24.4 | 25.4 | 1.0 |
| $5000^{th}$ | 25.1 | 24.4 | 26.1 | 1.7 |

A comparison will be made between the result indicated in Table 3 and the result indicated in Table 2. In Table 2, the thickness of the thinnest resin layer is 23.8 μm, and the thickness of the thickest resin layer is 26.4 μm.

The thickness variation including the individual variation is 2.6 μm (=26.4 μm–23.8 μm). In Table 3, the thickness of the thinnest resin layer is 24.0 μm and the thickness of the thickest resin layer is 26.1 μm. The thickness variation including the individual variation is 2.1 μm (=26.1 μm–24.0 μm). This result demonstrates that the method of newly supplying the resin-containing coating every time one coating layer is formed is more suitable in forming resin layers having the average thickness closer to the target value, and the thickness variation for the respective resin layers can be decreased, in comparison with the method of newly supplying the resin-containing coating every time ten coating layers are formed.

Embodiment 3

In Embodiment 3, another example of a method for manufacturing a multilayer information recording medium as shown in FIG. 1 will be described with reference to FIG. 9A to FIG. 10B.

Figure 9A:
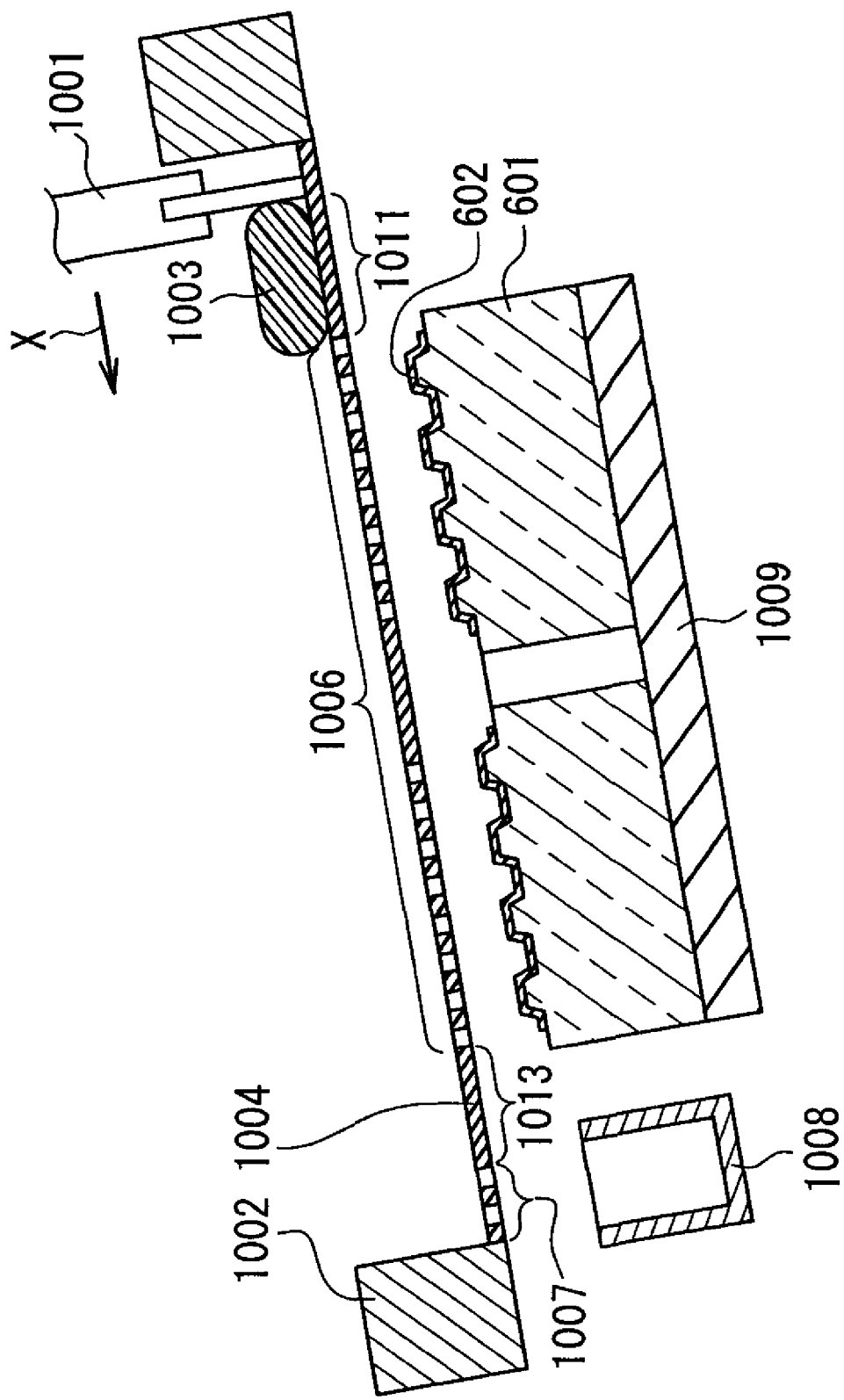
FIG. 9A is a sectional view of a process for describing still another example of a method for manufacturing the multilayer information recording medium shown in FIG. 1, showing a state just before application of a resin-containing coating.
Figure 9B:
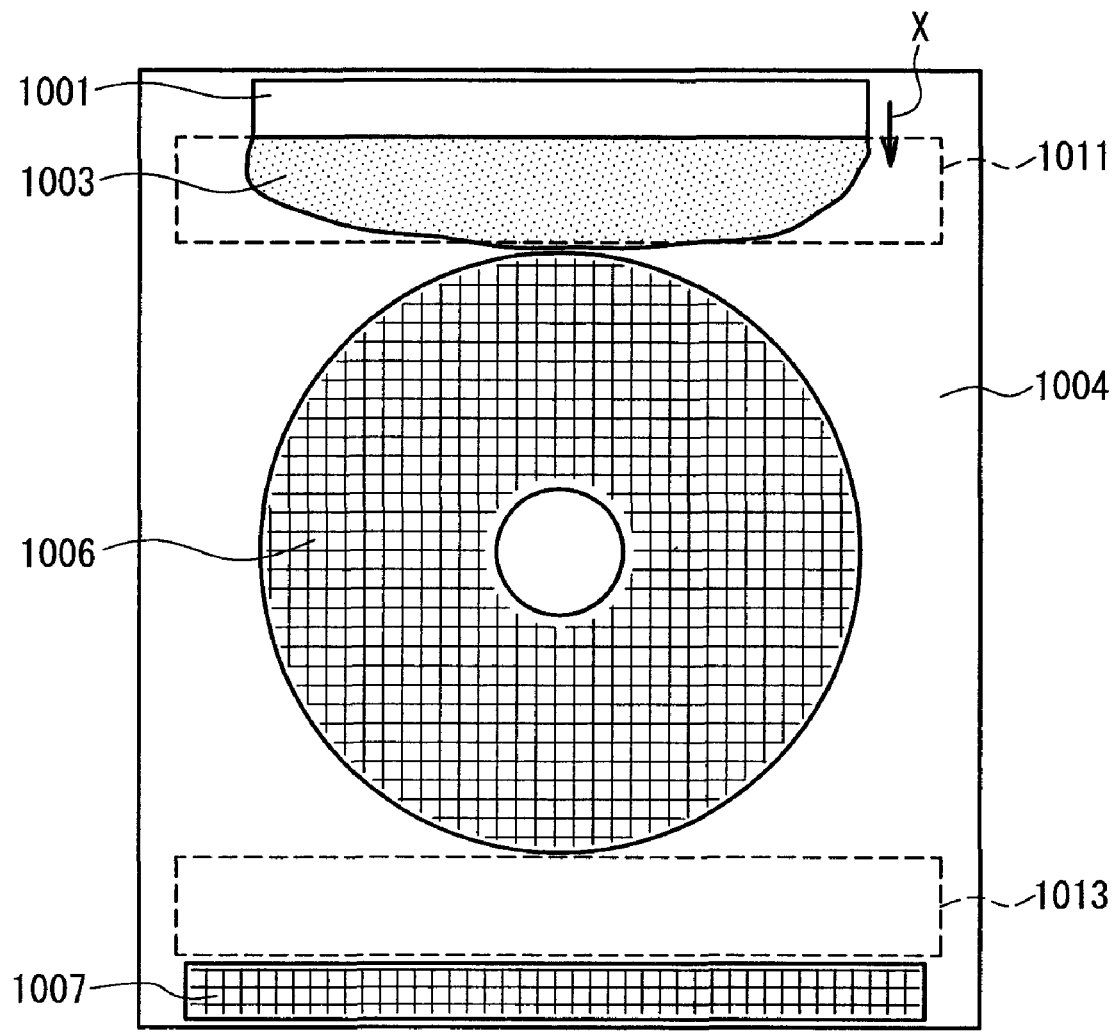
FIG. 9B is a plan view showing the screen and the squeegee shown in FIG. 9A.
Figure 10A:
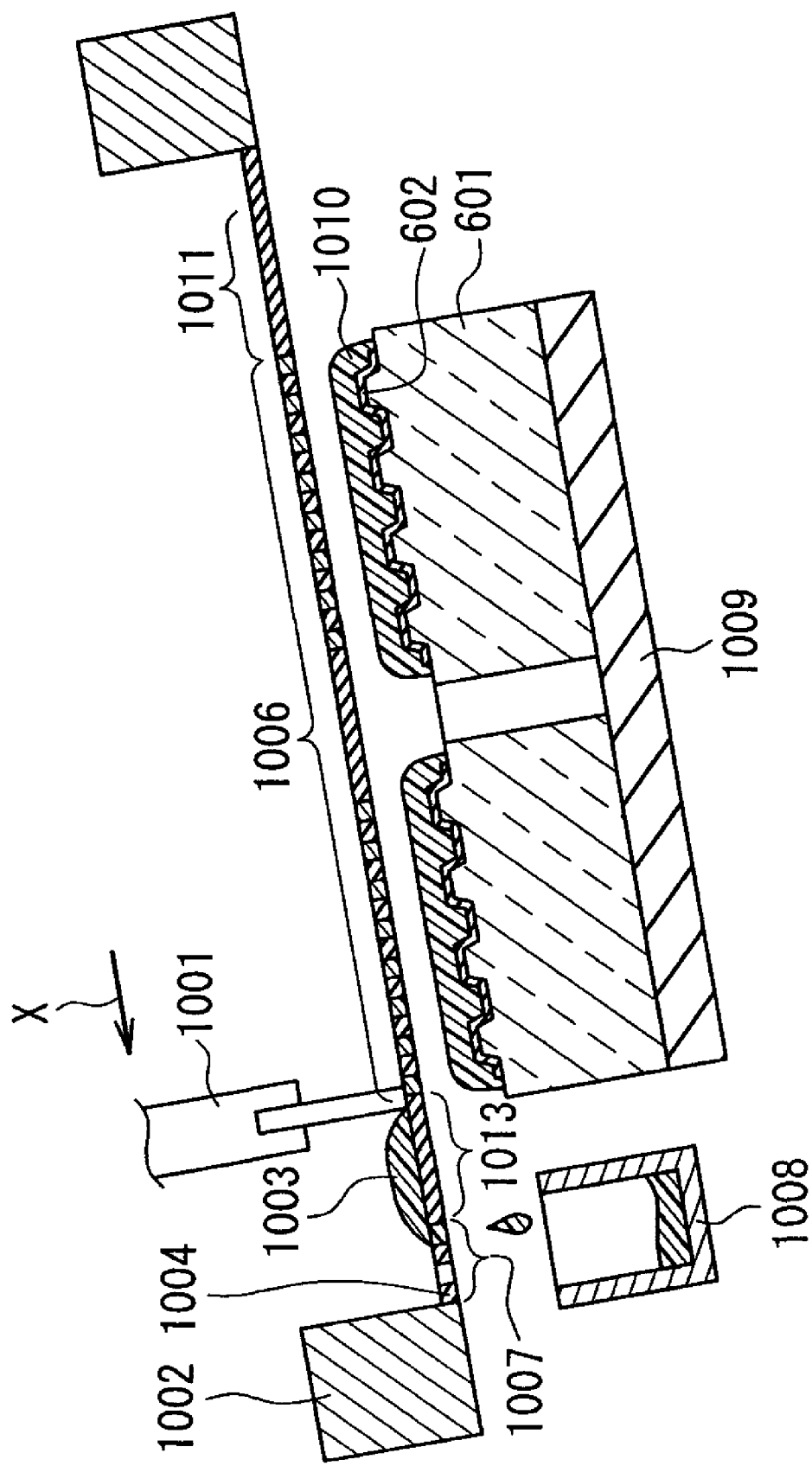
FIG. 10A is a sectional view of a process for describing still another example of a method for manufacturing the multilayer information recording medium shown in FIG. 1, showing a state just after application of a resin-containing coating.
Figure 10B:
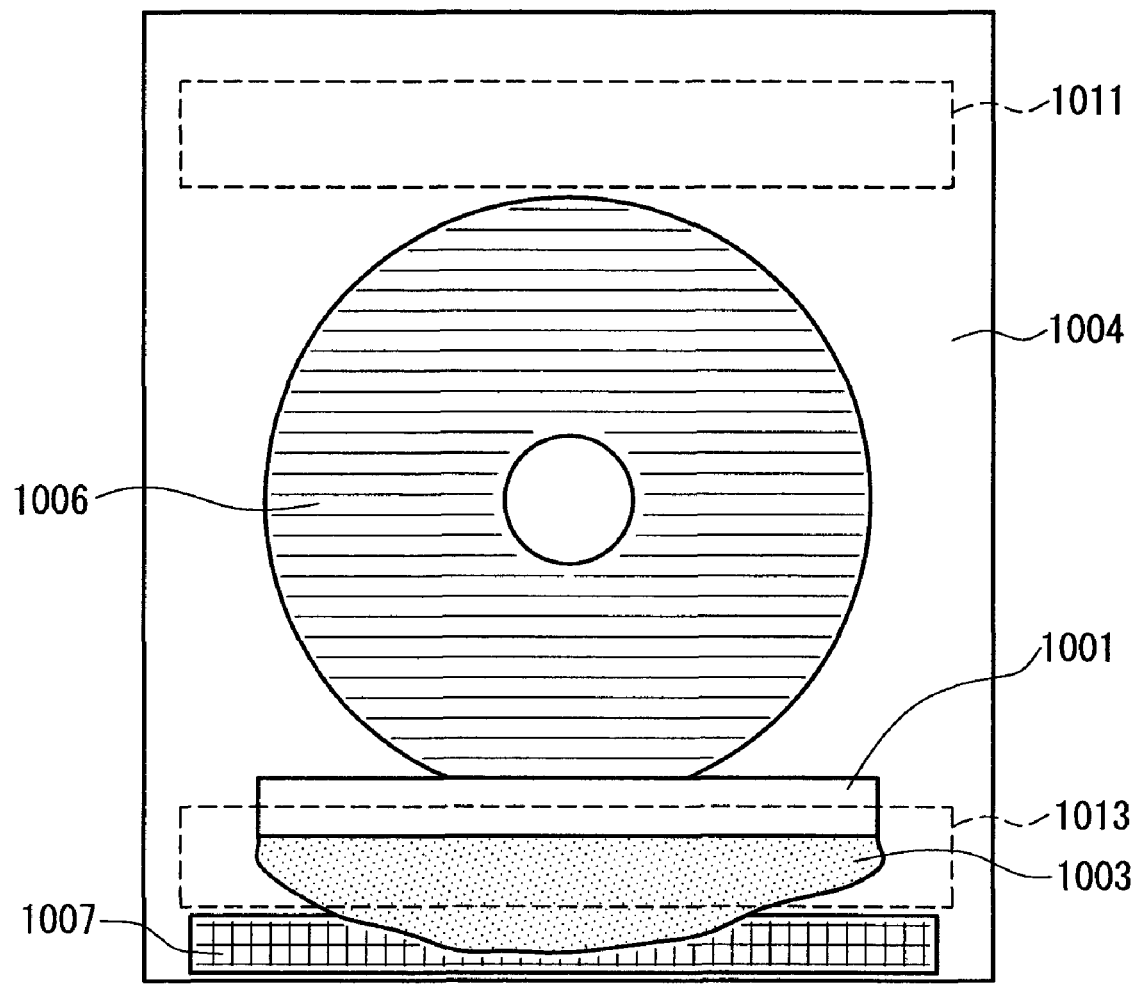
FIG. 10B is a plan view showing the screen and the squeegee shown in FIG. 10A.

FIG. 9A and FIG. 10A are sectional views of a process for describing an example of a method for manufacturing the multilayer information recording medium of the present embodiment. FIG. 9A shows a state just before application of a resin-containing coating, and FIG. 10A shows a state just after application of a resin-containing coating. FIG. 9B is a plan view showing a screen and a squeegee just before application of a resin-containing coating, and FIG. 10B is a plan view showing a screen and a squeegee just after application of a resin-containing coating.

In these figures, numeral 1001 denotes a squeegee, 1002 denotes a screen frame, 1003 denotes a resin-containing coating that contains an ultraviolet curable resin, 1004 denotes a screen, 601 denotes a first signal substrate, 602 denotes a first information recording portion, 1006 denotes an application region, 1007 denotes a removal region for removing excess resin-containing coating 1003, numeral 1011 denotes a coating-temporarily-retaining region, 1013 denotes a region between the application region 1006 and the removal region 1007, numeral 1008 denotes a container for holding an excess resin-containing coating 1003 removed from the screen 1004, numeral 1009 denotes a table, and 1010 denotes a coating layer formed above the first signal substrate 601 by applying the resin-containing coating 1003. The resin-containing coating 1003 used here can be the same as the resin-containing coating 103 used in Embodiment 1.

In the present embodiment, in the second process, the screen 1004 is inclined with respect to a horizontal plane so that the removal region 1007 is positioned lower than the application region 1006. Corresponding to the screen 1004, the first information recording portion 602 and the table 1009 are also inclined by the same angle. In this state, the resin-containing coating 1003 is applied on the first information recording portion 602. The method for manufacturing the multilayer information recording medium in the present embodiment is substantially same as Embodiment 1 except for the above-mentioned process. Thus, retention of the first signal substrate 601 and sliding of the squeegee 1001 are performed in the same manner as Embodiment 1. The inclination angle is in the range of 5 degrees to 30 degrees preferably. In one example in the present embodiment, the inclination angle was set to 10 degrees.

In the present embodiment, the resin-containing coating is applied in the state where the screen 1004 is inclined with respect to a horizontal plane so that the removal region 1007 is positioned lower than the application region 1006. As a result, the excess resin-containing coating 1003 can be removed more reliably from the surface of the screen 1004 without, for example, increasing the stroke length of the squeegee 1001 or providing removal auxiliary regions on the screen 1004 as in Embodiment 2.

The resin layers 605 and 607 are formed in the same manner as the resin layer 603. The first to fourth information recording portions 602, 604, 606, 608 and the transparent layer 609 are formed in the same manner as Embodiment 1, thereby a multilayer information recording medium shown in FIG. 1 is obtained. That is, after forming the first information recording portion 602 and the resin layer 603, the first process and the second process are carried out in this order respectively the required number of times. Finally, the transparent layer 609 is formed on the fourth information recording portion 608 (see FIG. 1).

Thereby, in the present embodiment, it is also possible to form resin layers that have desired thickness and excellent thickness uniformity just like in Embodiments 1 and 2. As a result, a multilayer information recording medium that can perform recording or reproduction of information favorably can be provided.

Embodiment 4

In Embodiment 4, an example of an apparatus for manufacturing a multilayer information recording medium of the present invention will be described with reference to FIG. 11 and FIG. 12.

Figure 11:
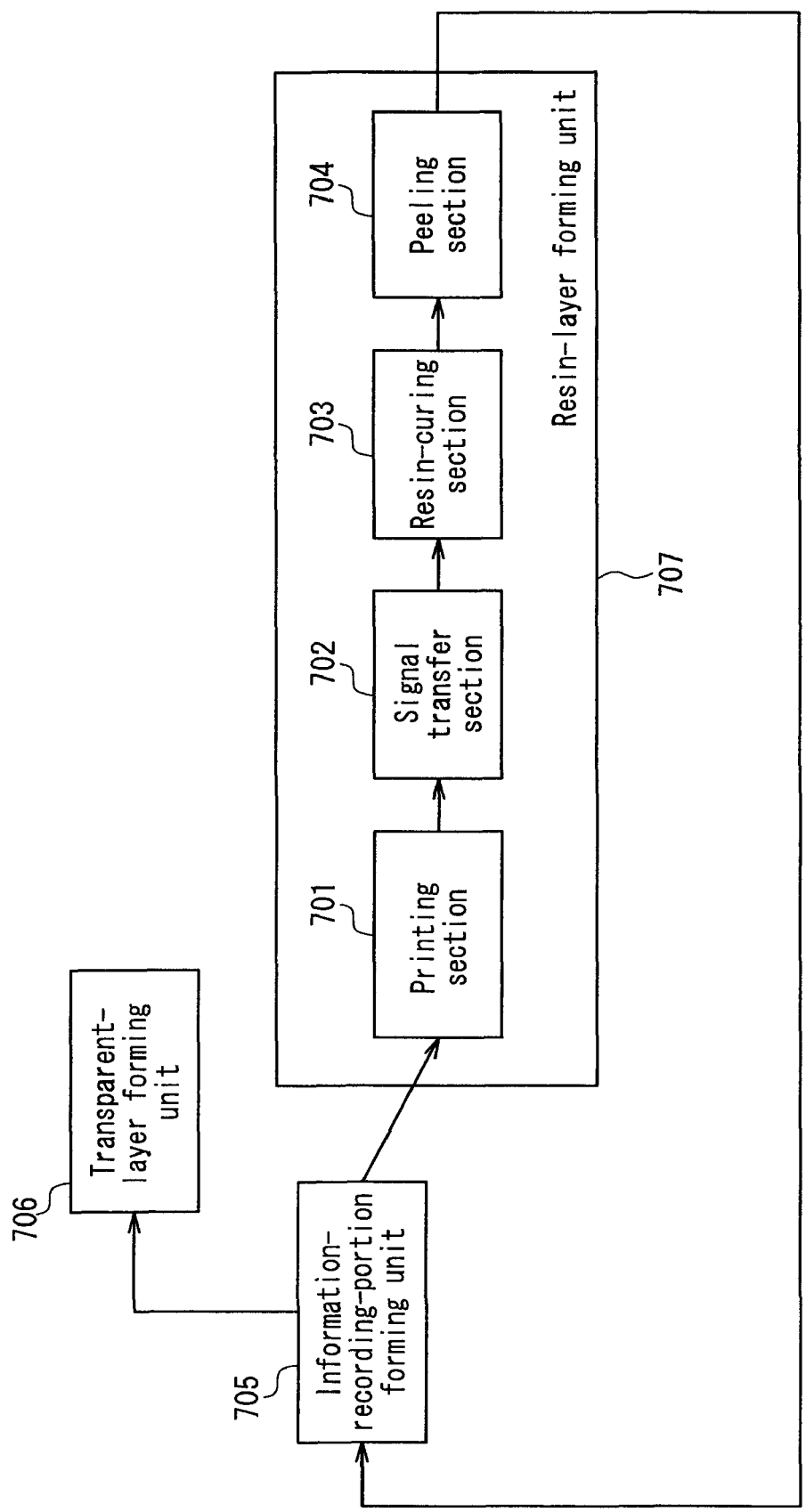
FIG. 11 is a block diagram showing an example of an apparatus for manufacturing a multilayer information recording medium of the present invention.

FIG. 11 is a block diagram showing an example of an apparatus for manufacturing a multilayer information recording medium of the present invention. FIG. 12 is a block diagram showing an example of a resin-layer forming unit constituting the apparatus for manufacturing a multilayer information recording medium (i.e., a printing device used in the process of manufacturing a multilayer information recording medium). In the present embodiment, the constitution and the operation of the apparatus of the present embodiment will be described with reference to the example of formation of the multilayer information recording medium shown in FIG. 1.

As shown in FIG. 11, the apparatus for manufacturing a multilayer information recording medium of the present embodiment includes an information-recording-portion forming unit 705, a resin-layer forming unit 707 and a transparent-layer forming unit 706. The resin-layer forming unit 707 includes a printing section 701, a signal transfer section 702, a resin-curing section 703 and a peeling section 704. With this apparatus, a plurality of multilayer information recording media can be manufactured continuously as mentioned below.

The information-recording-portion forming unit 705 is configured as a conventionally-known thin-film forming device, such as a sputtering device or a vapor deposition device. At the information-recording-portion forming unit 705, first, the first information recording portions 602 are formed in a certain order on the plural first signal substrates 601 (i.e., a process of forming an information recording portion).

Figure 12:
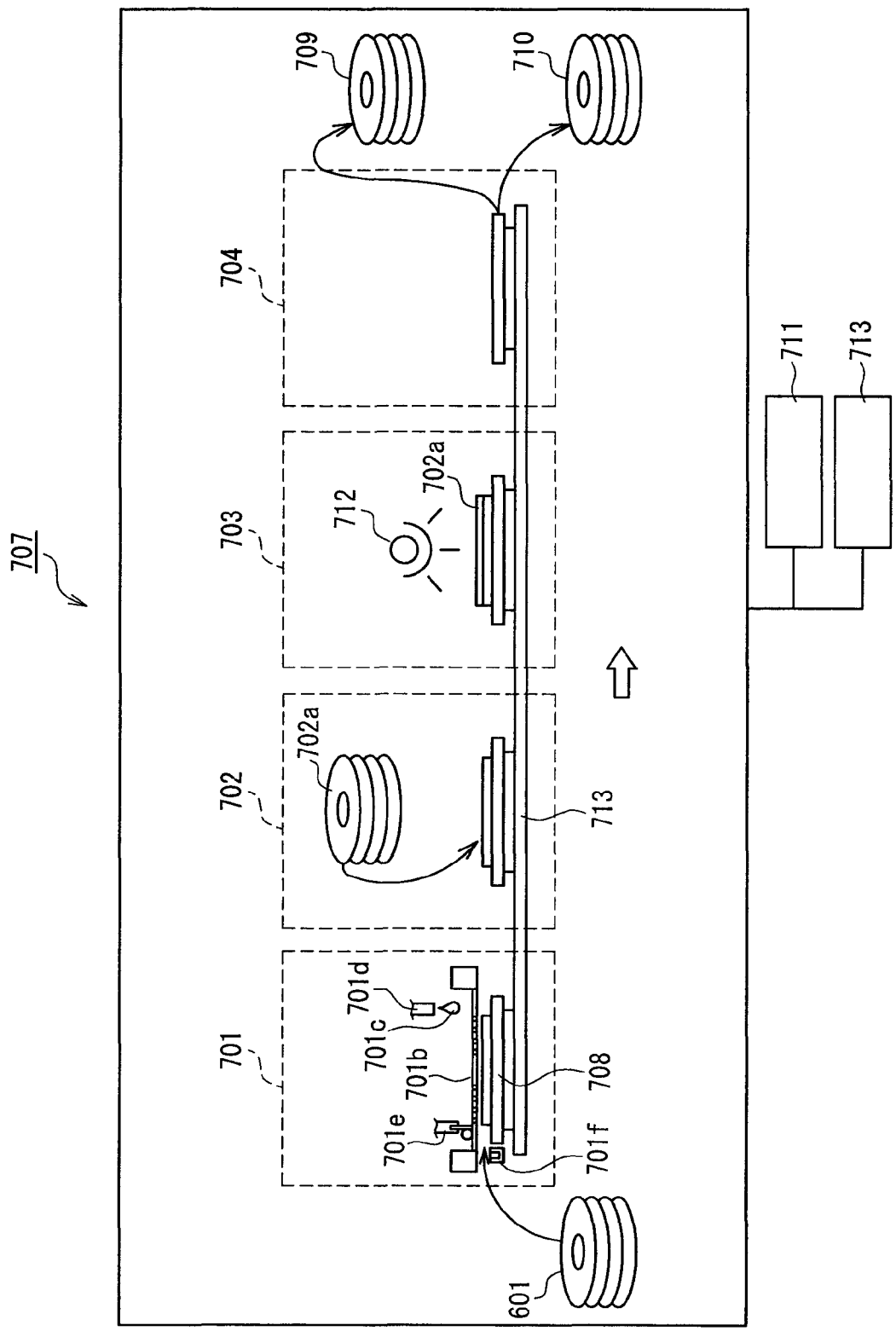
FIG. 12 is a block diagram showing an example of a resin-layer forming unit constituting the apparatus shown in FIG. 11 for manufacturing a multilayer information recording medium.

As shown in FIG. 12, the printing section 701 constituting the resin-layer forming unit 707 has, for example, a screen 701b, a coating-supplying part 701d, a squeegee 701e, and a container 701f for holding the excess resin-containing coating.

The screen 701b has a coating-temporarily-retaining-region 111 for temporarily retaining the resin-containing coating, an application region 106, and a removal region 707 similarly to the screen 104 described in Embodiment 1 (see FIG. 3B or FIG. 4B for example). The coating-supplying part 701d is a dispenser for example, which can supply a paste-like resin-containing coating 701c on the screen 701b. The screen 701b can have a removal auxiliary region 914, just like the screen 904 described in Embodiment 2 (see FIG. 6B and FIG. 7B).

The squeegee 701e can slide on the screen 701b while imposing a load on the screen 701b. When the squeegee 701e is slid with respect to the screen 701b, for example, a part of the resin-containing coating 701c supplied by the coating-supplying part 701d onto the screen 104 can be applied to the first information recording portion 602 through the application region (see FIG. 1 for example).

As shown in FIG. 12, the first signal substrate 601 on which the first information recording portion is formed is conveyed onto a table 708 placed in the printing section 701. In the printing section 701, the resin-containing coating 701c is applied on the first information recording portion on the first signal substrate 601. In this manner, a coating layer containing an uncured ultraviolet curable resin is formed on the first information recording portion.

The screen 701b has a removal region that can remove the resin-containing coating that remains after formation of the coating layer from the surface of the screen 701b. Thereby, the resin-containing coating will be removed from the removal region. The excess resin-containing coating is removed from the removal region during the replacement of the first signal substrate 601 on which the first information recording portion is formed, and/or during the coating layer is formed on the thus replaced first signal substrate 601 having the first information recording portion formed thereon.

It is preferable that the apparatus of the present embodiment includes a suction means for temporarily fixing the first signal substrate 601 on the table 708. An example of the suction means is a vacuum means.

As shown in FIG. 12, the signal transfer section 702 includes a plurality of signal transfer substrates 702a. Each of the signal transfer substrates 702a has an uneven surface serving as an information surface. Each of the coating layers conveyed by a conveyor unit 713 into the signal transfer section 702 and the signal transfer substrate 702a are attached to each other so that the information surface will be in contact with each of the coating layers. Thereby, the information surface of the signal transfer substrate is transferred to the coating layer. The conveying by the conveyor unit 713 is carried out in a direction indicated by an arrow in the figure.

As shown in FIG. 12, the resin-curing section 703 is provided with a light irradiator 712 that can emit ultraviolet light. By irradiating the respective coating layers conveyed into the resin-curing section 703 with the ultraviolet light through the signal transfer substrate 702a, the ultraviolet curable resin contained in each coating layer is cured to form a resin layer 603 (see FIG. 1).

A structure including the first signal substrate, the first information recording portion, the resin layer and the signal transfer substrate is conveyed into the peeling section 704 constituting the resin-layer forming unit 707. In the peeling section 704, the structure is peeled and divided on the interface between the resin layer and the signal transfer substrate. The peeling section 704 includes, for example, a pair of adsorption pads that can retain a structure 710 including a signal transfer substrate 709 and a resin layer on which an information surface is formed; and a metal plate or the like to be inserted into the interface between the signal transfer substrate 709 and the structure 710 so as to peel. Incidentally, in FIG. 12, numeral 709 is a signal transfer substrate peeled off from the resin layer, and 710 is a structure including the resin layer on which the information surface is formed.

In the present embodiment, the series of treatments in the resin-layer forming unit (a process of forming a resin layer) is carried out while keeping the entire resin-layer forming unit 707 in a decompression atmosphere by using a pressure-reducing pump 711. In FIG. 12, numeral 713 denotes a pressure detection device. The pressure detection device 713 is connected to a pressure controlling device (not shown) in order to make it possible to keep the pressure inside the resin-layer forming unit 707 constant. In this manner, application of the resin-containing coating, transfer of the signal, curing of the resin and the peeling are all carried out in the decompressed atmosphere. Thereby, it is possible to reduce contamination, entry of air bubbles in the resin layer and the entry of air bubbles into the resin-containing coating during printing.

The thus obtained plural structures 710 are conveyed in a certain order to the information-recording-portion forming unit and the resin-layer forming unit a predetermined number of times, and thus the second to fourth information recording portions 604, 606, 608 and the resin layers 605, 607 (see FIG. 1) are formed on each of the structures 710. That is, after forming the first information recording portion 602 and the resin layer 603, the process of forming the information recording portion and the process of forming the resin layer are carried out respectively in this order the required number of times (see FIG. 1).

After forming the fourth information recording portion 608 (see FIG. 1), the transparent layer 609 (see FIG. 1) is formed at the transparent-layer forming unit 706 as shown in FIG. 11. When the transparent layer is formed of a coating containing an ultraviolet curable resin for example, the transparent-layer forming unit 706 includes a printing section for forming the transparent layer and a resin-curing section for forming the transparent layer. The configuration of the printing section for forming the transparent layer can be the same for example as the printing section for forming the resin layer, as long as a particular part for forming the transparent layer is used regarding the screen. The resin-curing section for forming the transparent layer is not limited particularly as long as it is formed of a light irradiator for emitting ultraviolet light just like the resin-curing section of the resin-layer forming unit.

The explanations in Embodiments 1-4 refer to multilayer information recording media each including four information recording portions. However, the multilayer information recording medium and the method for manufacturing the same will not be limited to this example. Similarly, the apparatus will not be limited to an apparatus for forming a multilayer information recording medium including four information recording portions. The number of the information recording portions can be set to two or three, or not less than five, by adjusting the thickness of the first signal substrate, the respective resin layers, the transparent layer and the like. An information recording medium including a plurality of information recording portions can record and reproduce a large quantity of information.

In each of Embodiments 1-4, each of the first to fourth information recording portions is configured by disposing a reflecting film 503, a first dielectric film 504, a recording film 505 and a second dielectric film 506 in this order from the first signal substrate side (see FIG. 2), but the first to fourth information recording portions are not limited to this configuration. Each of the information recording portions will not be limited particularly as long as it includes at least a recording layer. At least one of the other films can be omitted; a film other than the above-described films can be included. Similarly, the materials of the reflecting film 503, the first dielectric film 504, the recording film 505 and the second dielectric film 506 are not limited to the materials as described in Embodiment 1, but any of the well-known materials can be used.

Though each of Embodiments 1-4 refers to a circular, so-called 'optical disc', the multilayer information recording medium of the present invention and the method for manufacturing the same are not limited to this example. For example, the present invention can be applied to a memory card and the like.

Though the resin layers in Embodiments 1-4 have information surfaces transferred by signal transfer substrates, the resin layers in multilayer information recording media such as a hologram memory are not required to include such information surfaces.

INDUSTRIAL APPLICABILITY

According to the method and apparatus for manufacturing a multilayer information recording medium of the present invention, resin layers with excellent uniformity in the thickness can be formed, and thus a multilayer information recording medium that has excellent capability in performing reproduction of information or recording/reproducing information can be provided efficiently. The present invention can be applied not only to a circular Blu-ray disc having a center opening, but also to a memory card, CD, DVD, a hologram memory and the like.

The invention claimed is:

1. A method for manufacturing a multilayer information recording medium comprising at least two information recording portions, a resin layer interposed between the information recording portions, and a signal substrate on which the information recording portions and the resin layer are disposed, the method comprising:
    a first process of forming a predetermined information recording portion on one principal surface of the signal substrate; and
    a second process of passing a part of a resin-containing coating, which is supplied on a screen having an application region with a plurality of first pores and a removal region with a plurality of second pores, through the first pores by sliding a squeegee on the screen so as to form a coating layer on the predetermined information recording portion, and curing the resin contained in the coating layer so as to form the resin layer;
    wherein the first process and second process are repeated respectively a predetermined number of times, and
    in every second process, at least a part of the resin-containing coating that has not been applied on the predetermined information recording portion and that remains on the screen is removed from the screen surface by passing through the second pores and into a container for holding the resin-containing.

2. The method for manufacturing a multilayer information recording medium according to claim 1, wherein the resin-containing coating removed from the screen surface is recycled and supplied newly on the screen.

3. The method for manufacturing a multilayer information recording medium according to claim 1, wherein the screen further has a removal auxiliary region that is disposed on the periphery of the application region along the traveling direction of the squeegee, and the removal auxiliary region has a plurality of third pores.

4. The method for manufacturing a multilayer information recording medium according to claim 1, wherein the screen has further a pair of removal auxiliary regions disposed to sandwich the application region, and each of the removal auxiliary regions has a plurality of third pores.

5. The method for manufacturing a multilayer information recording medium according to claim 1, wherein in the second process, the screen is inclined with respect to a horizontal plane so that the removal region is positioned lower than the application region; the predetermined information recording portion is inclined corresponding to the screen; and the resin-containing coating is applied on the predetermined information recording portion in the inclined state so as to form the coating layer.

6. The method for manufacturing a multilayer information recording medium according to claim 1, wherein in the second process, a signal transfer substrate having an uneven surface and the signal substrate are attached to each other via the coating layer, and after curing the resin contained in the coating layer, the signal transfer substrate is peeled off from the resin layer.

7. The method for manufacturing a multilayer information recording medium according to claim 6, wherein the signal transfer substrate and the signal substrate are attached to each other at a pressure lower than atmospheric pressure.

8. An apparatus for manufacturing a multilayer information recording medium comprising at least two information recording portions, a resin layer interposed between the information recording portions, and a signal substrate on which the information recording portions and the resin layer are disposed, the apparatus comprising:
an information-recording-portion forming unit for forming the information recording portions, and
a resin-layer forming unit for forming the resin layer;
the resin-layer forming unit comprises a printing section and a resin-curing section; where the printing section comprises:
a screen comprising an application region with a plurality of first pores and a removal region with a plurality of second pores,
a coating-supplying portion enabling supply of a resin-containing coating on the screen, and
a squeegee capable of sliding on the screen, and sliding on the screen to allow the resin-containing coating supplied on the screen by the coating-supplying portion to pass the first pores so as to form a coating layer on the information recording portion, and
a container capable of holding the resin-containing coating that can be removed from the screen surface; and
the resin-curing section has a capability of curing the resin contained in the coating layer,
wherein the removal region allows at least a part of the resin-containing coating that has not been applied on the information recording portion and that remains on the screen, to pass through the second pores so as to remove the resin-containing coating from the screen surface and into the container.

9. The apparatus for manufacturing a multilayer information recording medium according to claim 8, wherein the resin-layer forming unit further comprises:
a signal transfer section comprising a signal transfer substrate that has an uneven surface serving as an information surface and that is attached to the coating layer so as to transfer the information surface onto the coating layer; and
a peeling section that peels the signal transfer substrate off from the resin layer.

10. The apparatus for manufacturing a multilayer information recording medium according to claim 8, wherein the resin-layer forming unit comprises further a table to which the signal substrate is fixed removably.

11. The apparatus for manufacturing a multilayer information recording medium according to claim 10, wherein the screen is inclined with respect to a horizontal plane so that the removal region is positioned lower than the application region, and the table is inclined corresponding to the screen.

12. The apparatus for manufacturing a multilayer information recording medium according to claim 9, further comprising a recycling mechanism that recycles the resin-containing coating to be held in the container, and that allows the recycled resin-containing coating to be supplied to the coating-supplying portion.

13. The apparatus for manufacturing a multilayer information recording medium according to claim 8, wherein the screen further has a removal auxiliary region that is disposed on the periphery of the application region and along the traveling direction of the squeegee, and the removal auxiliary region has a plurality of third pores.

14. The apparatus for manufacturing a multilayer information recording medium according to claim 13, wherein the removal region and the removal auxiliary region are connected to each other.

15. The apparatus for manufacturing a multilayer information recording medium according to claim 8, wherein the screen has further a pair of removal auxiliary regions disposed to sandwich the application region, and each of the removal auxiliary regions has a plurality of third pores.

16. The apparatus for manufacturing a multilayer information recording medium according to claim 8, wherein the screen comprises:
an application region with a plurality of first pores so that at least a part of the resin-containing coating supplied on the screen passes through the first pores so as to be applied on the information recording portion; and
a removal region with a plurality of second pores so that at least a part of the resin-containing coating that has not been applied on the information recording portions and that remains on the screen passes through the second pores so as to be removed from the screen surface and into a container for holding the resin-containing coating.

17. A method for manufacturing continuously a plurality of multilayer information recording media each having at least two information recording portions, a resin layer interposed between the information recording portions, and a signal substrate on which the information recording portions and the resin layer are disposed, the method comprising:
a process of forming a predetermined information recording portion on one principal surface of the signal substrate; and
a process of forming the resin layer, the process comprising: passing a part of a resin-containing coating, which is supplied on a screen having an application region with a plurality of first pores and a removal region with a plurality of second pores, through the first pores by sliding a squeegee on the screen so as to form a coating layer on the predetermined information recording portion, and curing the resin contained in the coating layer;
wherein the process of forming information recording portions and the process of forming the resin layer are repeated respectively a predetermined number of times in order to manufacture respective multilayer information recording media; and
at least a part of the resin-containing coating that has not been applied on the respective information recording portions and that remains on the screen is passed through the second pores every time one or a plurality of coating layer(s) is/are formed or during formation of another coating layer, so that the part of the resin-containing coating is removed from the screen surface and into a container for holding the resin-containing.

18. The method for manufacturing continuously a plurality of multilayer information recording media according to claim 17, wherein the resin-containing coating is supplied newly on the screen every time one coating layer is formed.

* * * * *

UNITED STATES PATENT AND TRADEMARK OFFICE
CERTIFICATE OF CORRECTION

PATENT NO. : 8,007,867 B2
APPLICATION NO. : 11/997509
DATED : August 30, 2011
INVENTOR(S) : Tomekawa et al.

It is certified that error appears in the above-identified patent and that said Letters Patent is hereby corrected as shown below:

Column 32, line 29 (claim 1): after "resin-containing" insert --coating--.
Column 33, line 51 (claim 12): "claim 9" should read --claim 8--.
Column 34, line 54 (claim 17)" after "resin-containing" insert --coating--.

Signed and Sealed this
Fourteenth Day of February, 2012

David J. Kappos
*Director of the United States Patent and Trademark Office*